US010601805B2

(12) United States Patent
Lerner

(10) Patent No.: US 10,601,805 B2
(45) Date of Patent: Mar. 24, 2020

(54) SECURITIZATION OF TEMPORAL DIGITAL COMMUNICATIONS WITH AUTHENTICATION AND VALIDATION OF USER AND ACCESS DEVICES

(71) Applicant: Daniel Maurice Lerner, Missouri City, TX (US)

(72) Inventor: Daniel Maurice Lerner, Missouri City, TX (US)

( * ) Notice: Subject to any disclaimer, the term of this patent is extended or adjusted under 35 U.S.C. 154(b) by 0 days.

(21) Appl. No.: 16/173,091

(22) Filed: Oct. 29, 2018

(65) Prior Publication Data

US 2019/0230077 A1    Jul. 25, 2019

Related U.S. Application Data

(63) Continuation of application No. 16/005,040, filed on Jun. 11, 2018, now Pat. No. 10,154,021.

(60) Provisional application No. 62/518,281, filed on Jun. 12, 2017.

(51) Int. Cl.
*H04L 29/06*  (2006.01)
*H04L 9/08*  (2006.01)
*H04L 9/14*  (2006.01)
*G06F 16/27*  (2019.01)
*G06F 21/53*  (2013.01)

(52) U.S. Cl.
CPC .............. *H04L 63/08* (2013.01); *G06F 16/27* (2019.01); *G06F 21/53* (2013.01); *H04L 9/088* (2013.01); *H04L 9/0819* (2013.01); *H04L 9/0866* (2013.01); *H04L 9/14* (2013.01); *H04L 63/0428* (2013.01); *H04L 63/0876* (2013.01); *H04L 63/104* (2013.01); *H04L 63/20* (2013.01)

(58) Field of Classification Search
CPC ........................................................ H04L 63/08
See application file for complete search history.

(56) References Cited

U.S. PATENT DOCUMENTS 4,558,176 A * 12/1985 Arnold .................... G06F 21/10
380/29
4,578,530 A   3/1986 Zeidler
4,665,396 A * 5/1987 Dieleman ............ G06Q 20/341
235/382

(Continued)

OTHER PUBLICATIONS

Papadimitrtos et al.; Secure data communication in mobile ad hoc networks; Published in: IEEE Journal on Selected Areas in Communications (vol. 24 Issue:2, Feb. 2006); pp. 343-356; IEEE Xplore (Year: 2006).

(Continued)

*Primary Examiner* — Bradley W Holder
(74) *Attorney, Agent, or Firm* — Guerry L. Grune; ePatentManager.com

(57) ABSTRACT

One more devices and/or access control systems are described that securitize data and data transmissions using three sets of computing operations including authentication, validation, and securitization that allows or denies access to the data and/or the data transmissions. The system includes securitization of signals between one or more secure master and/or partial DASA databases for various user devices. Specific methods and devices for securing (primarily digital and normally two-way) communications using applications that offer the combination of securing communications from user devices with reader devices, are also is provided.

21 Claims, 12 Drawing Sheets

(56) References Cited

U.S. PATENT DOCUMENTS

| | | | |
|---|---|---|---|
| 5,446,880 A * | 8/1995 | Balgeman | G06F 16/258 |
| 5,825,890 A | 10/1998 | Elgamal et al. | |
| 6,157,722 A | 12/2000 | Lerner et al. | |
| 6,466,780 B1 | 10/2002 | Geiselman et al. | |
| 6,766,161 B2 | 7/2004 | Geiselman et al. | |
| 6,917,974 B1 * | 7/2005 | Stytz | H04L 63/04 |
| | | | 709/225 |
| 6,959,086 B2 | 10/2005 | Ober et al. | |
| 6,996,723 B1 * | 2/2006 | Kyojima | H04L 9/0822 |
| | | | 380/45 |
| 7,032,240 B1 * | 4/2006 | Cronce | G06F 21/34 |
| | | | 705/51 |
| 7,181,016 B2 | 2/2007 | Cross et al. | |
| 7,382,883 B2 | 6/2008 | Cross et al. | |
| 7,660,422 B2 * | 2/2010 | Mitchell | H04L 9/083 |
| | | | 380/277 |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 2002/0124177 A1 * | 9/2002 | Harper | G06F 21/6245 |
| | | | 713/189 |
| 2004/0022222 A1 * | 2/2004 | Clisham | H04L 69/18 |
| | | | 370/338 |
| 2005/0047600 A1 * | 3/2005 | Newkirk | H04W 12/04 |
| | | | 380/278 |
| 2005/0069139 A1 * | 3/2005 | Higurashi | G06F 21/10 |
| | | | 380/284 |
| 2005/0201564 A1 * | 9/2005 | Kayashima | H04L 9/0891 |
| | | | 380/283 |
| 2006/0233371 A1 * | 10/2006 | Sowa | H04L 9/0822 |
| | | | 380/248 |
| 2006/0235852 A1 * | 10/2006 | Gaug | G06F 16/2471 |
| 2006/0258296 A1 * | 11/2006 | Steer | G01S 7/021 |
| | | | 455/67.13 |
| 2007/0168677 A1 | 7/2007 | Kudo et al. | |
| 2009/0006856 A1 | 1/2009 | Abraham et al. | |
| 2012/0198538 A1 | 8/2012 | Spring et al. | |
| 2012/0314867 A1 * | 12/2012 | Tomaru | H04L 9/08 |
| | | | 380/270 |
| 2015/0195089 A1 * | 7/2015 | Yajima | H04L 9/0869 |
| | | | 380/46 |
| 2017/0012642 A1 | 1/2017 | Declercq et al. | |
| 2017/0140175 A1 * | 5/2017 | Angus | G06F 21/602 |
| 2017/0365780 A1 | 12/2017 | Narayanan et al. | |

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year:2003).

* cited by examiner

SECURITIZATION OF TEMPORAL DIGITAL COMMUNICATIONS WITH AUTHENTICATION AND VALIDATION OF USER AND ACCESS DEVICES

PRIORITY CLAIM

This application is a continuation of and claims priority under 35 USC § 120 to U.S. patent application Ser. No. 16/005,040 filed Jun. 11, 2018, which is a nonprovisional conversion of and takes priority under 35 USC § 119(e) to US from provisional patent application 62/518,281, filed Jun. 12, 2017 entitled "Securitization of Temporal Digital Communications with Authentication and Validation of User and Access Devices" and hereby incorporates all contents of this aforementioned provisional application by reference into the present application.

FIELD OF THE INVENTION

The technical field comprises cyber security. The present disclosure further relates to the security of communications, and more particularly to a system that securitizes signals between one or more secure databases for a number of hardware, real or virtual devices including personal security cards either in combination with or between cellular/smart phones to ensure proper entrance or access into secure locations by only approved personnel. Methods and devices for securing (primarily digital and normally two-way) communications using applications that combine securing those communications for wireless/cellular phones with personnel access card readers (or other devices designed to receive security clearance for entry into secure locations) are not yet well established. These combined communication and access devices require using specific computational techniques essential to denying fraudulent or otherwise unauthorized personnel with the ability to enter or access security protected devices or secure locations.

BACKGROUND

Various methods have attempted to authenticate, validate, securitize, and provide computational masking techniques to prevent undesired access to communications and communication signals, many with limited success. Most online transactions, for instance, are considered secure with assurances provided by the service providers employed to protect users' data and privacy. Unfortunately, in many if not all cases, these communications are protected with information private to a user and stored by a third-party. Continuous news regarding compromised private data, previously considered to be secure, has sparked new awareness of data vulnerability in the private, public, industrial and government sectors. In just the last year, global companies including Facebook, Equifax, Delta Airlines, Amazon and others have admitted to having data breaches which are affecting daily operations and their respective stock values.

The problem of securely storing and managing personal and private information today requires the users of personal computers and smart phones to install and run special purpose client applications specifically designed for such task. Exemplary programs are software products known as password managers such as those provided by Lastpass, Dashlane, Roboform, and 1Password. The operation of these commercial products typically requires users to authenticate themselves before they are granted access to information, data or services that are either financially relevant or confidential in nature. In other words, these products operate on the assumption that users are effectively and securely authenticated before access to the stored data is provided.

The most common, simple, and convenient form of authentication is based on the use of a static (i.e. fixed in time) credential (e.g. a password) which the user must provide to the application each time it is executed. In these scenarios, the security of all the stored data completely relies on the secrecy of the authentication credential. This is the only factor guarding against illegitimate usage by unauthorized individuals. The need to remember only one password to access all the data stored by password managers and the pivotal role this requirement plays in securing the private data is demonstrated by the customary appellation of a master password. One main argument in favor of using password managers requiring one single static master password is clearly and simply convenience, whereby the user can access all passwords anytime and anywhere as long as the user remembers just one single secret or confidential credential.

In the case where passwords are to be shared between devices, vendors of software password managers have developed and deployed computer cloud-based services designed to support synchronization requirements of users. Typically, such service requires the payment of a yearly fee and the servers store and retrieve from the cloud the latest password database that has been previously copied in encrypted format over the Internet from any of the installed database instances of the client application. When properly implemented by the vendors, this method can allow satisfying both the synchronization requirement as well as the need to provide an updated backup of the latest password database that can later be used for recovery purposes.

Summarizing, from the above description, the typical method employed for operation of software password managers is that users can install the client application on any of their digital platforms (laptop, PC, smart phone, etc.) and remain confident that by remembering only the master password they will be granted access to the latest version of the password database. This method works as long as they are connected to the Internet/an intranet such as the World Wide Web or an abbreviated version thereof.

The critical enabling underlying factors while employing software password managers are that users must: (1) rely on the confidentiality of the Master Password as the sole protection against unauthorized disclosure of all the contents of the password database. In other words, an attacker capable of sniffing or obtaining in other fraudulent way the master password can in principle and in practice gain access to all other passwords kept in the password database; (2) trust the product vendor and cloud service provider with the entire contents of the password database, albeit in encrypted format. In other words, notwithstanding all of the provided assurances, the user must release his most valuable data to a third party in the hope that it will be securely handled according to all the agreed and implied policies and procedures; and (3) accept the limitation of synchronizing the password database across computing platforms only when accessing Internet (i.e. while operating online). This requirement is at the root of the cloud as a service-for-fee and in some products (e.g. LastPass) and it is also extended to the case of one password database on a single platform (i.e. passwords are all stored on the cloud and cannot be accessed offline).

The three tenets of mainstream software password managers' usage described above, namely rely, trust, and accept, pose serious questions regarding the practical security and suitability of such products in today's real-life digital information management scenarios. In fact, the use of a static master password has been shown to be ineffective against social engineering, brute force guessing and malware driven attacks whereby a third party is capable of obtaining the password for reading any amount of the private stored data before the legitimate user discovers the theft. Such attacks highlight the main weakness of static login credentials, i.e., the decoupling of the authentication credentials from the individual which they are purposing to authenticate. In this case, the simple knowledge of the password allows any individual to access the data that is only supposed to be accessed by the authenticated entity. In the case of password managers, the security threat can be even more effective than against web services which can stop providing the service when under attack. In fact, once attackers copy the local password databases they can perform brute force rounds to discover the Master Password (or equivalent confidential/secret key) without any limitation on the number of attempts.

The use of static login credentials for applications requiring strong security assurances such as password managers has, therefore, been strongly criticized by security professionals warning about the catastrophic consequences of a theft or an unauthorized disclosure of the master password.

To this end, having realized that this problem risks undermining the very foundations of their products' value proposition, vendors of software password managers have started advocating the adoption of small hardware devices as additional authentication means beyond the simple and sole master password.

There is also a general class of two-factor authentication methods which aim at binding the presence of the physical user to the requirements of the authorization procedure. The second factor in addition to the static credentials can be something that the user has (a physical device or a token external to the host device) or something that the user is (obtained using biometric sensors, e.g. via fingerprinting or iris scanning). Because of limitations due to the technology and to the still relatively high costs associated to mass deployments of biometric devices, the prevailing choice has until now been to provide users with small hardware tokens which the users must have and operate each time they request access to the password database and cloud service.

However, both the static master password and the two-factor authentication methods described above suffer from at least one fundamental weakness, i.e., the need to rely on an application (a software controlled process executed on the host device) to authorize the user and communicate with the cloud sever.

For example, the application executing on the host device may require to retrieve a password, in which case the cloud sever may generate a random session key, and then protect the session key in such a way that it can be obtained only with the user-specific secret key kept in the hardware device owned by the user. With this approach, it would seem that no one except the legitimate user could receive the data, since only the password manager application can access the secret key and the secret key can never leave the device safely kept and operated by the user.

However, this approach has a weakness in that a rogue application, developed by a malicious programmer and executed on the user's host device—or on the programmer's device through remote connection—can make an identical request to the cloud server after obtaining all the necessary authentication data from the unaware user. In fact, the objective of the rogue application is only to access the sensitive cloud resources and not to know or extract the user-specific secret key from the hardware device. To obtain its goal, the rogue application can simply make the same authentication request to the cloud server that the client application would do using the user-specific secret, and thus obtain access to the sensitive data on the server. In this example, there is nothing to differentiate from the cloud server point of view the password manager's authentication request from that of the rogue application. Once this latter approach has gained access to the service, it can in principle operate independently from the legitimate application and from any further user input.

Remarkably, the weakness described above applies to all user-based authentication methods, regardless of the enabling technology applied to generate and store the secret access credentials. In fact, the roots of this vulnerability rest in the need for all user-based authentication methods to rely on the trustworthiness of the applications employed to communicate with the cloud service providers.

It is therefore clear that the security of cloud-enabled transactions is first and foremost dependent on the ability to authenticate executable code running on a host device, an issue which falls into the more general category of software security. The goal of providing reliable and practicable means for remotely authenticating software applications has been the subject of U.S. Pat. No. 8,713,705B2 and will not be further discussed here. Suffice it to conclude, however, that the approach advocated by vendors of software password managers cannot claim to resolve, in any definitive way, the critical vulnerability tied to the user's authentication and authorization when employing a static Master Password, with or without additional "strong" authentication means.

The criticality mentioned above is clearly related to the catastrophic nature of the security failure which occurs once the authentication and authorization steps are bypassed by a malicious code or attacker, namely the exposure of the entire contents of the password database. Hence, it is highly desirable to improve prior methods for authorizing access to private information and data. The authentication process is inadequate and we have addressed this issue in the present application.

In addition, cryptographic methods to keep information shared among users, software, devices and the like, secure, are becoming more prevalent. Many judge just how secure a communication is by comparing which encryption algorithm is employed. Examples of encryption algorithms that are commercially used today include AES (Advanced Encryption Standard), Triple-DES (Data Encryption Standard), Blowfish, and RC4. Thus, the sheer number and variety of encryption methods provides questions regarding which encryption is best and how much encryption is enough.

Unfortunately, encryption alone does not ensure security and more importantly, privacy. Data that travels over "free and open" communication mediums such as cell phones and internet communications paths are perfect targets for interception. Many individuals and organizations believe (with a false sense of security) upon the pretense of their data being encrypted. Normally, encrypting the data with a pre-existing algorithm simply means that an equally outstanding algorithm is required to decrypt. Conversely, an easier method to decrypt exists: keys. Much like the keys to a home, the strength of the encryption over these insecure "free and open" communication media are only as good as the keys and the algorithms that use the keys to unlock the data. Basically the principal is simple; find the proper key, and unlock the door.

Basically, two distinct encryption methods are widely used today: Symmetric and Asymmetric. Both are key-based algorithms. Which method is more secure is the subject of much debate.

Symmetric cryptography (also known as private-key, single-key, secret-key, shared-key, and one-key encryption) exchanges "secret-keys" that are identical (or related computationally) to encrypt and decrypt data between two or more users. Types of symmetric key ciphers include block ciphers that input blocks of plaintext and stream ciphers that input individual characters. Popular examples of block cipher methods include TripleDES (Data Encryption Standard) and AES (Advanced Encryption Standard). RC4 is an example of stream cipher.

For Symmetric Methods the advantages are simplicity and speed. Users only have to specify a single key to encrypt or decrypt data. Symmetric cryptography is also much more resistant to brute force attacks and requires less computational power than its counterpart asymmetric cryptography. One major issue involving the use of this method is that "secret keys" must be shared via a secret communication channel, which is the very purpose of sharing secret keys in the first place, thus presenting a "chicken-and-egg" situation. In addition, the origin and authenticity of a message cannot be guaranteed, since both users use the same key, leaving this method, like many other cryptographic methods, open to "man-in-the-middle" attacks. Lastly, communication with every new user requires a new key to be shared to prevent compromise of a "universal key", thereby increasing the number of keys that have to be stored securely.

Another type of cryptography is cryptographic hash functions. This method enables "digital signatures" to authenticate who a message is from and whether a message has been altered. Hash functions output a short hash of fixed length that is unique to a message and its author. Hash functions have gone through many mutations, culminating in 2012 when NIST (National Institute of Standards and Technology) announced an algorithm from Keccak that won a competition and will thereby be the new Secure Hash Algorithm (SHA), called SHA-3.

Asymmetric cryptography is a method that enables two parties to secretly agree on a shared encryption key. Since proposed in a paper from Whitfield Diffie and Martin Helman in 1976, the idea of cryptography using "public and private mathematically related keys", also called asymmetric, has been become widely popular, especially in online communications. Asymmetric cryptography uses two keys. One key is shared publicly between users to use for encryption, while the other key is kept private to use for decryption. A public key is derived from a private key in such a way that that the private key can decrypt data encrypted from a related public key, but not vice versa. No information about a private key can be derived from a public key.

The trade-offs for asymmetric methods include a chief advantage of asymmetric cryptography that includes the reduction in the number of unique secret keys that have to be shared between users requesting to communicate. Disadvantages of this method include computational cost, slow speed, and the possibility for widespread compromise if a single private key is compromised. Additionally, data may be irretrievable if a private key is lost. In addition, asymmetric encryption is far more susceptible to brute force attacks than symmetric encryption. For example, AES 256 is as strong as 15,360-bit methods using asymmetric encryption such as RSA (Rivest-Shamir-Adleman). Last and possibly most challenging is that the lack of authentication of public keys leaves the real possibility for man-in-the-middle attacks where a third party can impersonate an intended recipient by intercepting a sender's public key and exchange his or her own credentials with the sender without either the intended recipient nor the sender's knowledge.

Trusted 3rd Parties (Certificate Authorities) such as PKI (Public Key Infrastructure) and PGP (Pretty Good Privacy) are examples of asymmetric methods of encryption that rely upon some "trusted" authority to establish trust between peers over open communications such as the internet. These certificate authorities issue certificates that contain a public key of an entity and a cryptographic signature of the issuer, which is then passed to an intended recipient as evidence "they are who they say they are" (i.e. their "identity"). PGP and PKI differ in how they establish "trust." PKI is based upon predetermined "trusted" certificate authorities (CA) while PGP is based on a "web of trust" that allows users to choose who they trust.

Trade-offs for Certificate Authorities in a similar fashion to symmetric and asymmetric cryptography, include the fact that certificate authorities are vulnerable to man-in-the-middle attacks. If a certificate authority is compromised, another party can cause false certificates to be issued to impersonate another entity. For instance, in July 2012, NIST issued a warning that theft of certificates would allow attackers to issue new "valid" certificates and/or "sign" malware. Although 3rd party certificate authorities may add security in some circumstances, credibility of this method is diminished when reports of compromise surface. New methods such as certificate pinning causes man-in-the-middle attacks to be more difficult, but it can still be bypassed in many ways. Under this architecture, if the certificates are compromised, likely so are all sessions that utilize the certificates and their associated keys.

There are other methods to improve cryptography as a means of mutual authentication that include asymmetric/symmetric combinations, such as SSL and TLS, where symmetric private keys are shared within encryption by public keys. These methods still have the issue of a shared secret between entities. It has also been shown that a private key becomes more susceptible to disclosure the longer it is used with a public key (PKI). SSL/TLS overcomes the weaknesses of authentication with PKI by using Certificate Authorities to certify the identity of a server or entity, and then overcomes the weaknesses of the speed computational expense of PKI by negotiating a temporary symmetric key for rapid encryption and decryption during a communication session. This approach places emphasis on signature process with certification authorities, which also has weaknesses as previously discussed.

Regardless of the cryptographic method used for encryption or authentication, an approach that ensures entities "are who they say they are" is needed for various scenarios, for example, where a device falls into the hands of an unauthorized user. For such instances, methods such as biometrics have been promoted.

The use of biometrics exists and entails the same principle of key management for encryption which also holds true for authentication. Authenticating methods that validate "you are who you say you are" typically utilize biometric features that uniquely identify an individual from any other individual. Unfortunately, like encryption keys, a biometric key is just another key that, if compromised, may provide a false sense of security. Furthermore, many implementations send biometric data along with other keys to authentication servers, traversing communication paths with limited security, leave the biometric sample open to interception. In addition, the widespread collection of biometric templates by governments and private companies alike, both whose custodianship has been brought into question as of late, further increases the chances of unauthorized access. Again, the same principle for exchanging encryption keys applies to exchange of authentication keys: Find the key, and unlock the door.

One approach that improves authentication is multi-factor authentication (MFA). MFA requires 2 or more factors to authenticate. Authentication factors generally consist of:

Knowledge—"something you know"
Possession—"something you have"
Biometrics—"someone you are"

Knowledge factors include passwords (secret words or phrases), PIN (personal identification number), and patterns (sequence(s) of cells). Possession factors include tokens (FOB, USB, contactless RFID, and the like), smart cards, etc. Biometric factors are typical biometric identifiers such as finger, face, voice and IRIS, among others.

Which cryptographic authentication and encryption method is more secure is the subject of much debate. Regardless of the encryption method, the issue with encryption is that the keys still must be protected. Compromise of a private key, though unlikely, could prove catastrophic. Whether disclosure is a result of flawed implementations or a flawed protocol or architecture, recent disclosures of private data bring into focus the need for some new approaches to guarantee authenticity and place control of data into the hands of the user to control the entity's secrets, keys, and private data.

SUMMARY

The present disclosure provides the ability to secure digital communications for the authorization, validation, and access of user and access devices that includes as many as five levels of securitization that ensure complete security of all communications between these devices.

More specifically, the present disclosure provides for one or more devices comprising a real or virtual master distributed auto-synchronous array (DASA) database located within or external to these devices that at least stores and retrieves data and that includes at least two or more partial distributed auto-synchronous array (DASA) databases wherein the partial DASA databases function in either an independent manner, a collaborative manner or both, and wherein the master and/or partial DASA databases allow for bi-directional transmission of data to and from multiple partial user devices, to and from multiple partial access devices or to and from both user and access devices, wherein one or more access and/or user devices store and provide at least partial copies of portions of the master DASA database and wherein the master DASA database, the partial DASA databases or both, are linked and communicate with each other as well as one or more logging and monitoring databases capable of statistical and numerical calculations utilizing the data, wherein the system authenticates using a first set of computing operations, validates using a second set of computing operations, and wherein a third set of computing operations controls access for a specified set of users.

Here the computing operations function to provide a set of rules and/or guidelines with instructions on how to implement those rules and/or guidelines. The rules are governed by computer operations that may invoke these sets of rules as required during these computer operations.

The master and partial DASA databases analyze and provide information in a form of data and act to control one or more output devices, wherein the output devices can create user devices. This means that the output devices can be manipulated and configured to produce user devices capable of communication with the user devices created. These user devices can be created as real (hardware) or virtual (software with accompanying hardware) devices.

In addition, the partial user devices and said partial access devices are independent and capable of completing operations without a need for other partial user devices and partial access devices.

The partial user devices and the partial access devices are networked and cooperate to complete required operations.

The devices include at least one virtual user device that provides a separate storage and retrieval location which is utilized in a sequential manner such that the virtual user device is not physical but operationally appears as if it is a physical device. Here, the at least one virtual user device provides data for partial access devices such that virtual user devices functionalities are provided via one or more access devices. In addition, the partial access devices act upon the partial user devices and are capable of distinguishing a physical user device from a virtual user device.

The partial access devices can also utilize the partial user devices without distinguishing the physical user device(s) from said virtual user device(s).

In another embodiment, the virtual user device requires utilization in sequence unless tolerance allows rules for out of sequence usage, wherein the logging and monitoring database include temporal aspects regarding the data.

In some instances, the partial DASA databases operate independently and utilize a designated portion of a user's record existing within the partial DASA databases and within the master DASA database. In other cases, the partial DASA databases store and retrieve data but are not required to perform data manipulation with computational operations.

In a further set of embodiments, the partial user devices transmit data and are not required to perform computational operations, and the user devices are selected from a group consisting of; tickets, chits, tokens, RFID tags, radio, electrical, magnetic, electromagnetic and radiative tags, and wavelengths of optical and wavelengths of sonic energy tags.

The computer readable media described within this application is non-transitory. In most if not all cases, the transmission of data is transmitted via signals that are non-transitory signals.

The signals are generated via at least one form of energy selected from one or more of the group consisting of; electrical, optical, mechanical, chemical, magnetic, radiative, electro-optical, electro-mechanical, electrochemical and electro-magnetic energy.

According to said first set of computer operations that provides a first set of computing operations that can optionally include rules, authentication attempts utilize the designated portion of said user's record such that the first set of computing operations that include rules invoke constantly changing said designated portion within the user's record of the auto-synchronous either master or partial DASA database or both types of DASA databases.

Non-authentication events do not cause constant changing of the designated portion of the user's record within both types of DASA databases. Both the non-authentication and authentication events can both be recorded.

After authentication, validation occurs according to computer operations that provide a second set of computing operations that optionally include rules, wherein a subset of data with user specific information exists within the designated portion of the user's record, such that validation requires retrieving, analyzing, utilizing and storing the subset of data that is subsequently changed when validation of specific data within the subset occurs. Here validation provides allowance to attempt access.

After authentication and validation, a third set of computer operations that result in a third set of computing operations are invoked, so that access and denial is a recorded event that is stored and resides within a user's records. If access is granted, verification is provided indicating access occurred.

As the third set of computing operations are invoked, access and denial is a recorded event stored in the logging and monitoring database that is separate from both master and partial DASA databases.

The recorded events are a number, n, of events that influence future access and denial of the specified set of users. After a number, n, of events, access is denied until temporal rules re-enable access.

Temporal rules are invoked via utilization of elapsed time that is accessed from the partial user devices, the partial access devices, or an external source capable of temporal measurement. Temporal rules are invoked via utilization of calendrical and associated clock time accessed from either the partial user device, the partial access device, or an external source.

Further, if access to the specified set of users is allowed but the specified set of users decides not to gain access, use of an entry code associated with gaining access is not reusable and if entry is provided but not utilized, a threshold number of access attempts are recorded, resulting in denial of access.

Each attempt for access causes a new code be generated from partial auto-synchronous DASA databases and provides for each attempt, thereby each attempt results in an ability to encrypt a different encryption for the data, the data transmission, and the new code. In most cases, the third set of computing operations provides degrees of access that allow partial access. In addition, the third set of computing operations is combined with logic embedded within the partial user devices or the partial access devices or both partial devices, wherein the partial user devices and the partial access devices or both partial devices are smart devices in that the smart devices are capable of at least one of a set of functions selected from a group consisting of; acquisition, analysis, storage and retrieval of the data.

In additional embodiments, the DASA databases the designated portion of the user's record can correspond with a single user. Here, the master or partial databases reside on a server that communicates with one or more computers or computerized equipment. The master or partial DASA databases are generated and the DASA databases possess required data memory storage and data micro-processing speeds so that at least a fraction of the master or partial DASA databases or both are capable of utilization during any data transaction.

At least one encryption application exists within the master or partial DASA databases or both and wherein the at least one encryption application possesses one or more keys. The data transmission from the partial user device is encrypted with one or more keys and the data transmission is received by the access device and decrypted with the keys.

In a further embodiment, the one or more keys are generated from a subset of data with user specific information existing within the designated portion of the user's record of the master or partial auto-synchronous databases or both such that authentication is implemented according to the first set of computing operations, wherein the first set of computing operation also includes encryption and decryption computing operations that include rules.

In another embodiment, the one or more keys are generated from a subset of data with user specific information residing outside the designated portion of the user's record of the master or partial auto-synchronous databases or both such that authentication occurs according to the first set of computing operations wherein said first set of computing operations includes encryption and decryption computing operations.

In another embodiment, at least one encryption application is secured in a secured database within a secured cloud or other secured computer aided storage system that utilizes one or more of the group selected from: a computer accessible cloud, a network, the Internet, an intranet, and at least one server.

In addition, it is possible that at least one application employs at least a single level encryption process as follows:

a first level of encryption and decryption of data transmission utilizing keys wherein a first set of encryption keys exist or are created and are retrieved from one or more encryption applications, the applications existing within one or more databases or data storage devices containing the first set of encryption keys, wherein a user accesses and utilizes at least a single key that exists in both the partial user device and the partial access device via utilization of the distributed auto-synchronous array master or partial DASA databases or both databases that exists are accessible by both virtual and real user devices and access devices, wherein at least a single key exists within the virtual and real devices, thereby alleviating a need to distinguish between user identification IDs;

a second level of encryption and decryption of data transmission utilizing keys wherein at least one user ID is attached to the data and wherein the at least one user ID is placed within an unencrypted portion of the data such that a user can access and acquire at least one key from a user record but not out of the one or more encryption applications, such that one or more users possess their own key and an unencrypted user ID in received data is utilized to select one or more user's data records such that at least one key from one or more user's data records is utilized; and wherein the user ID attached to the data is attached via a tag of the data and;

wherein a third level of encryption and decryption of data transmission utilizing keys provides for multiple user records that exist for multiple users wherein the users can access and acquire the keys wherein the keys residing within the master or partial DASA databases or both are constantly changing wherein smart user devices utilize constantly changing keys;

a fourth level of encryption and decryption of data transmission utilizing keys wherein the keys are located in an expanded data record field within a range of data records so that a designated portion of the expanded data record field is utilized wherein the keys are in a first record of the designated portion providing one or more unique keys for a data transmission.

In most if not all embodiments, the designated portion is constantly changing.

In yet another embodiment, a fifth level of encryption and decryption of data transmission utilizes keys such that the keys are produced from any combination of a group consisting of: record numbers, recorded time, and random numbers associated with the user record, wherein one or more computer generated keys exist or can be created and allow for generation of an identical key using a substantially identical computer-generated computing operation for decryption.

One or more computer generated keys exist or are created within the master and/or partial DASA databases. In addition, for the fifth level of encryption, an instance of transmitting data generates a new set of one or more pairs of keys without transmitting the new set of keys from the partial user device(s) to the partial access device(s). In some cases, the absence of transmission of the new set of keys cannot be intercepted without access to the DASA databases.

It is important to understand that for any level of encryption, if data fields are picked that are changed during use of the partial user device, keys cannot be intercepted without access to the DASA databases.

The master or partial DASA databases or both are encrypted to protect against unauthorized access of said DASA databases. The protection of the DASA databases is provided by utilizing a system key for each user to be allowed access to the devices.

Tolerance of the designated portion is provided when data is in transit from the designated portion to the partial access device(s) and wherein transit of the data is synchronized between the partial user device(s) and the partial access device(s).

According to the first set of computing operations and associated rules being used for defining authentication, the first set of computing operations also relate to, correspond with, or invoke tolerance computing operations that search for an access device's data record regarding data sent by the partial user devices.

In a further embodiment, when data in transit is asynchronous in that the data in transit is not exactly matched or in synchronization with data within or external to devices that the data in transit is transmitted to and when data in transit is transmitted outside of a predetermined and limited tolerance, no authentication associated with the data in transit can be achieved.

When synchronization is not occurring, resynchronization is achieved by changing a designated portion during access to the partial access devices to match the designated portion of the partial user devices.

In another scenario, resynchronization occurs a user ID is utilized to select a user record according to a third set of computing operations, thereby allowing the user record to be accessed from a known portion of one or more master or partial DASA database(s) or both databases and wherein resynchronization recognizes a specified set of users to ensure proper resynchronization in order that the partial access devices can allow or deny access for the specified set of users.

In yet another embodiment, during a process authentication, a user or user's device decrypts each data record within a designated portion that possess its own unique key and the process continues until the user finds a match of the data record with the key.

Here, the tolerance computing operations provides a desired range within which the system operates and the tolerance computing operations utilizes one or more record numbers via one or more distinct computing operations that encrypt and decrypt data. Here, the tolerance computing operations further comprise an increased in complexity by applying a check of additional records within a designated portion of the partial user and partial access devices along with temporal limitations that limit authentication.

First attempts to access a secure device or location begins by acquisition of one or more keys that utilize a tolerance that provides for a number of attempts, (n), to retrieve keys from a configuration table wherein at least one encryption application with a get next key routine is invoked locally on or in proximity to the partial user device to generate encryption keys and to generate a new master key and wherein simultaneous attempts are made to match a partial user's device user identification (ID) encryption keys with an encryption database derived from the user ID encryption keys by using a specific tolerance number or range selected from many numbers available through a number generator.

At least one encryption application is added for layering security for the devices and associated system so that a match is determined to establish whether a user of the partial user devices has access privileges.

The encryption keys can be removed from a user table either, before, during, or after the match such that a key management system ensures that the keys are neither discoverable nor compromised in that a user of the devices and associated system cannot locate the keys and further even if the keys were located they could not be acted upon by the user.

The partial DASA databases include a list of identifiers and codes that reside in either the partial user devices or the partial access devices or within both devices, such that the devices include a device that functions as two or more devices so that both a user device and another an access device possess matching databases that communicate with each other and utilize one or more encryption applications.

In some embodiments, the partial access device is a reader device. In other embodiments, the reader device is a badge reader.

For additional embodiments, the partial user devices communicate internally within the partial user devices and externally from the partial user devices by transmitting and receiving data utilizing one or more encryption applications and a secured location and wherein the reader device is a detecting device that searches, retrieves, and analyzes a recognizable securitized and encrypted data signal generated after installation of the encryption application is completed.

In some cases, the data is comprised within a token. The token is recognized by the reader device that controls access to the partial user device and controls access to the reader device and also controls access to one or more locations.

The data can be provided as code, where the code is selected from a group consisting of: a QR code, a bar code, a digital code, an analog code, and a 7-bit binary code.

The one or more partial user devices and one or more partial access devices can be data transceiver devices.

The data transceiver devices are intelligent and one or more receivers are intelligent in that the data transceiver devices and the receivers are computerized and possess memory.

The partial user device is selected from a group consisting of cellular phones, cameras, infrared transmitters, optical transmitters, WiFi transmitters, Bluetooth transmitters, ultra-wide band near-field transmitters, communication transmitters, radiation transmitting devices, magnetic strips, and smart chips.

The partial user devices and partial access devices can comprise sensors selected from a group consisting of RFIDs, gyro sensors, magnetic field sensors electromagnetic field sensors, electrical optical infrared sensors, radar sensors, lidar sensors, inclination accelerometers, inclinometers, cameras, and bio-sensors.

The partial access devices can be a cellular phone wherein the partial access devices are a cellular phone that comprises a camera.

The cellular phone can be a smart phone that can access, interact with, and display Internet provided data as well provide GPS guidance and allow for computational search, retrieval, and analysis of data derived from, residing within, or accessed by the smart phone.

Here, the partial access devices can be selected from a group consisting of: controllers and switches that control a flow of energy to and from devices including lights, transportation vehicles including aerospace vehicles, elevators and escalators, electrical switches, and electrical contacts, wherein said controllers and switches are selected from a group consisting of: rheostats, thermostats, and transformers, wherein the controllers and switches are selectively manipulated to operate and control the devices within a specified range. These devices can be local or remote from the system as described herein.

The QR code can found by a partial access device that is recognizable in that it is recognized by a user's cellular phone and allows access to a user identification (ID) encryption key from the QR code which is subsequently passed through at least one encryption application.

It is also possible that simultaneously the partial access devices may send one or more messages in the form of a group consisting of: an oral message, a verbal message, a text message, and data message, wherein said messages are displayed and are associated with an encryption match.

Rather than simply providing devices that securely communicate, the present disclosure also describes a complete access control system comprising; a real or virtual master distributed auto-synchronous array (DASA) database located within or external to the access control system that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from one or more partial user devices, to and from one or more partial access devices or to and from both partial user and access devices, wherein the partial user and access devices store and provide at least partial copies of portions of the master DASA database and wherein the master DASA database, the partial DASA databases or both databases, are linked and communicate with each other as well as with one or more logging and monitoring databases capable of statistical and numerical calculations utilizing the data, wherein the one or more devices authenticates using a first set of computing operations, validates using a second set of computing operations, and wherein a third set of computing operations controls access for a specified set of users. As before, these computing operations provide for a set of rules that when carried out control and operate the securitization system of the present disclosure.

As described above, the master and partial DASA databases analyze and provide information in a form of data and act to control one or more output devices, wherein said output devices can create user devices. The partial user devices and the partial access devices are independent and capable of completing operations without a need for other partial user devices and partial access devices. The partial user devices and the partial access devices are networked and cooperate to complete required operations. The devices include at least one virtual user device that provides a separate storage and retrieval location which is utilized in a sequential manner such that the virtual user device is not physical but operationally appears as if it is a physical device.

The access control system provides for at least one encryption application to exist and master or partial DASA databases or both and wherein the at least one encryption application possesses one or more keys. The data transmission from the partial user device is encrypted with one or more keys and wherein the data transmission is received by the access device and decrypted with the keys.

One or more keys are generated from a subset of data with user specific information existing within the designated portion of the user's record of the master or partial auto-synchronous databases or both such that authentication is implemented according to a first set of computing operations, wherein the first set of computing operations also includes encryption and decryption computing operations.

The one or more keys are generated from a subset of data with user specific information residing outside the designated portion of the user's record of the master or partial auto-synchronous databases or both such that authentication occurs according to a first set of computing operations wherein the first set of computing operations includes encryption and decryption computing operations.

Here, at least one encryption application is secured in a secured database within a secured cloud or other secured computer aided storage systems that utilize one or more of the group selected from: a computer accessible cloud, a network, the Internet, an intranet, and at least one server.

The least one application employs at least a single level encryption process as follows:

a first level of encryption and decryption of data transmission utilizing keys wherein a first set of encryption keys are retrieved from one or more encryption applications, the applications existing within one or more databases or data storage devices containing the first set of encryption keys, wherein a user accesses and utilizes at least a single key that exists or is created in both the partial user device and the partial access device via utilization of the distributed auto-synchronous array master or partial DASA databases or both that exists are accessible by both virtual and real user devices and the access devices, wherein at least the single key exists within the virtual and real devices, thereby alleviating a need to distinguish between user identification (IDs);

a second level of encryption and decryption of data transmission utilizing keys wherein at least one user ID is attached to the data and wherein the at least one user ID is placed within an unencrypted portion of the data such that a user can access and acquire at least one key from a user record but not out of the one or more encryption applications, such that one or more users possess their own key and an unencrypted user ID in received data is utilized to select one or more user's data records such that at least one key from one or more user's data records is utilized; and wherein the user ID attached to the data is attached via a tag of the data and;

wherein a third level of encryption and decryption of data transmission utilizing keys provides for multiple user records that exist for multiple users wherein the users can access and acquire the keys wherein the keys residing within the master or partial DASA databases or both are constantly changing wherein smart user devices utilize constantly changing keys;

a fourth level of encryption and decryption of data transmission utilizing keys wherein the keys are located in an expanded data record field within a range of data records so that a designated portion of said expanded data record field is utilized wherein the keys are in a first record of the designated portion providing one or more unique keys for a data transmission.

In most if not all cases, the designated portion is constantly changing.

As before, for a fifth level of encryption and decryption of data transmission utilizes keys such that the keys are produced from any combination of a group consisting of: record numbers, recorded time, and random numbers associated with said user record, wherein one or more computer generated keys exist or are created and allow for generation of an identical key using a substantially identical computer-generated computing operation for decryption.

For these access control systems, it is possible that simultaneously the access device send a message in the form of a group consisting of an; oral, verbal, text, and data message that is displayed and specifically states "attempting encryption match".

BRIEF DESCRIPTION OF THE DRAWINGS

So that the above recited features and advantages of the present disclosure can be understood in detail, a more particular description of the invention, reference to embodiments are provided and illustrated in the appended figures. It is to be noted, however, that the appended drawings illustrate only typical embodiments of the present disclosure and are therefore not to be considered limiting scope or other equally effective embodiments.

DETAILED DESCRIPTION

While the foregoing discussion has dealt primarily with detecting unauthorized communicating devices, the present invention may also include the ability to detect unauthorized users. In many applications, including credit card authorization and approval and cellular telephone communications, it is frequently desirable to verify that the communication is being initiated by an authorized user. The inclusion of a user authorization system is beneficial for reducing the use of authentic communicating devices when they have been stolen or lost. Losses due to the use of lost or stolen communicating devices is also very significant, but is inherently limited to the capacity of the authorized communicating device itself, i.e., one communication at a time, a credit limit, etc. Furthermore, the use of lost or stolen communicating devices by unauthorized users may be restricted by the use of user (transaction) specific codes (TS codes), such as a personal identification number (PIN), finger print, password, voice commands and the like.

Figure 1:
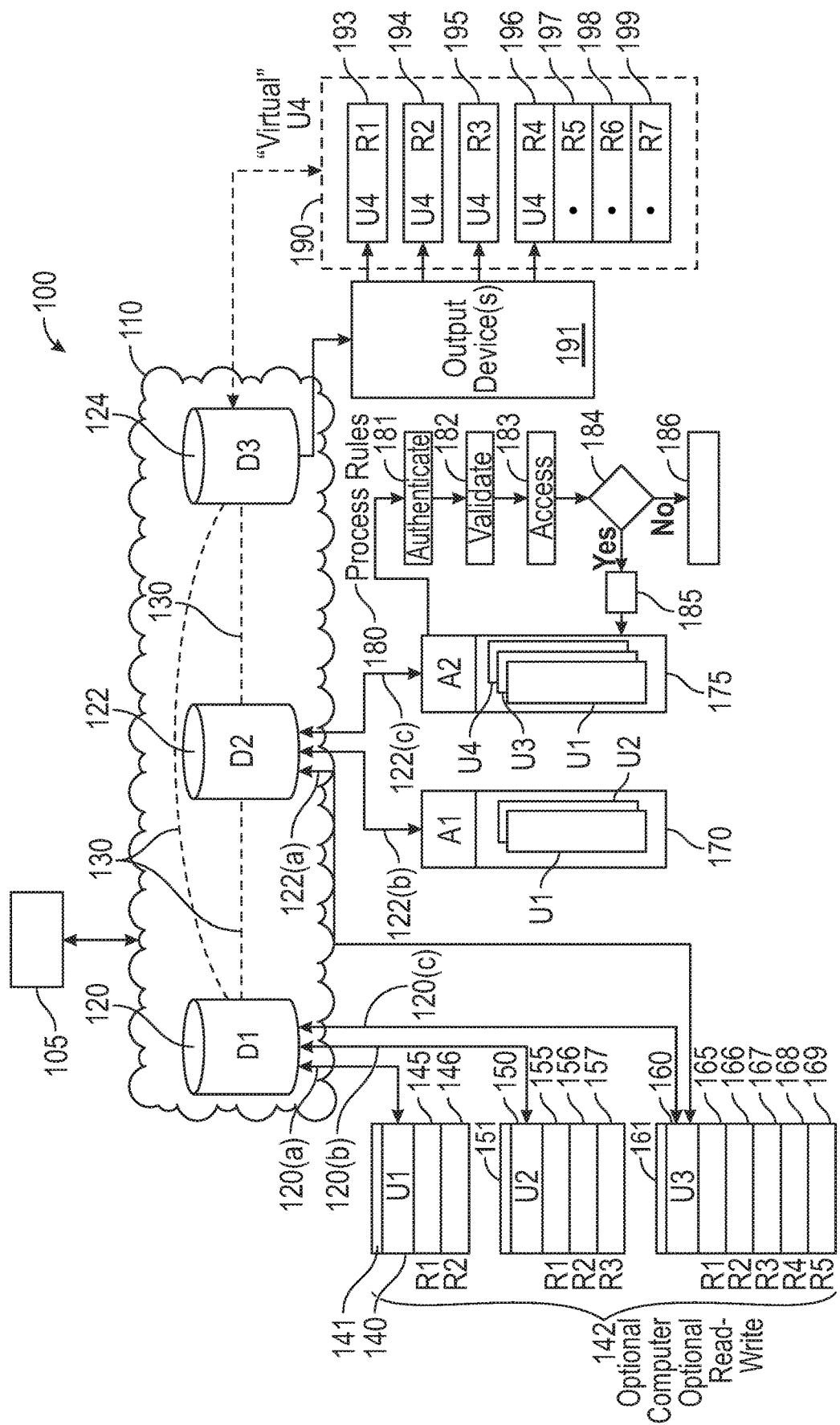
FIG. 1 is a schematic diagram which provides at least one embodiment of the computer enabled access control (securitization) system, which contains, in this instance, a real or virtual master distributed auto-synchronous array (DASA) database.

Specifically, FIG. 1 is a schematic which provides at least one embodiment of the computer enabled access control (securitization) system (100), which contains, in this instance, a real or virtual master distributed auto-synchronous array (DASA) database (110), depicted as a cloud, that at least stores and retrieves data and that includes at least two or more partial distributed auto-synchronous array (DASA) databases D1, D2, D3, shown as (120, 122, and 124) so that the partial DASA databases 120(D1), 122(D2), and 124 (D3)) are capable of functioning in an independent and/or collaborative manner (130), and such that the master DASA database (110) and partial DASA databases (120, 122, and 124) allow for bi-directional transmission of data, shown as (120a), (120b), and (120c) for 120 (D1) as well as for 122 (D2) with transmissions (122a), (122b), and (122c). Simply for the purposes of illustration, these transmissions are shown to be different than the transmissions shown to exist for (124), D3 as will be further explained below. It should be noted that the D3 transmissions can be identical to those of D1 and/or D2 and that multiple databases D1 . . . Dn can exist.

The multiple partial user devices U1, U2, U3 are shown as (140), (150), and (160) respectfully. The multiple partial user devices in this instance include 2 sets of records in U1(140); U1R1(145) and U2R2 (146), 3 set of records in U2(150), U2R1(155), U2R2(156), and U2R3 (157), and 5 sets of records in U3 (160); U3R1(165), U3R2 (166), U3R3(167), U3R4 (168), and U3R5 (169). Each of these user devices contains optional computing capabilities (141, 151, and 161) that also provide for overall optional read/write functionality (142). Multiple partial access devices (A1—170 and A2—175) exist that can store and provide at least partial copies, U1 (140) with a set of records U1R1 and U1R2—(145,146), U2 (150), with sets of records U2R1, (155), U2R2, (156), and U2R3, (157). Access device A2 (175), in this case possesses 3 sets of records, U1 (140), with records U1R1, (145) and U1R2, (146), U3, (160), with 5 sets of records U3R1 through U3R5; (165-169) and U4 (190), which is a virtual user device, that in this instance contains 7 records, U4R1 through R7 that are represented as U4R1 (193), U4R2(194), U4R3(195), U4R4(196), U4R5(197), U4R6(198), and U4R7(199). The virtual user device, U4 (190) is created by output device(s) (191) e.g. printers, scanners, tokens, stamps, RFID tags, encoders, wave scanners, electromagnetic devices, etc. which subsequently create virtual user devices (U4). In other cases, it is possible that these user devices could be a collection of both real and virtual user devices that also can be connected to a partial database D3 (124).

In this case, virtual U4 (190), U4R1 (193) is a printed bar code ticket that could be provided in a paper or electronic format. U4R2 (194) is a QR code printed on a more durable plastic medium or electronic format. U4R3(195) is an electronic record sent to a user's personal smart display device (e.g. an application on a cell phone) which displays a QR code on its screen. U4R5-U4R7 (196-199), in this case are RFID tags that provide for bi-directional nearfield communications. Each of these records within the virtual U4 device (190) are produced by appropriate output devices (191) for each media type. In the case of U4R3(195) which is for a "smart" or intelligent application and for U4R4-U4R7 (196-199) which is a read-write device, these records can be distinguished from a single photographic copy so that only the designated users/user devices can possess the authentic and validated records. The read-write capability allows for verification of the actual token, which is not possible for records U4R1(193) and U4R2(194), which are simple images. The simple images must still be used in sequence, in a single instance, unless tolerance rules provide otherwise.

Here the master DASA database (110) and/or partial DASA databases (120, 122, and 124) are linked and communicate with one or more logging and monitoring database(s) (105) capable of statistical and numerical calculations utilizing or otherwise involving the data. An alarm function can also be implemented with or without the assistance of temporal devices (such as clocks and other timepieces).

FIG. 1 also provides, as an example, a set of process rules which are carried out directly or indirectly as computer operations (180) that are followed to authenticate (181), validate (182) and determine access (183) for user devices. These rules apply to all access devices, including access devices, A1 (170) and A2 (175). There can be, and often are, different rules that should be followed for other access devices. The flow path provided indicates that the access device(s) authenticates (181) using a first set of rules, validates (182) using a second set of rules, and includes a third set of rules that controls access (183) using data that has been supplied by the user devices to ensure access to only a specified set of users under specified conditions.

The process computing operations which includes rules are finalized with an access decision (184) which includes at least two options. One option is an access decision (185) that includes the process of allowing user access and verifies the user has invoked their privileges. This may include, for example, physical access such as opening doors or logical access such as unlocking data within databases or communication systems. Normally the user would be alerted to the system when allowing access. The user's activity then may be monitored by the access process to ensure that they have utilized their access within certain limitations. Physical limitations may be provided by enabling door monitoring switches, floor-mats, man traps, video analysis, etc. Logical limitations may be monitored by keyboard and/or data access and the like. Temporal limitations may be employed as required. Access may further be limited by counting the number of access/egress attempts. In the case of access denial (186), the user will be normally notified of the denial of access and optional alarming may take place. Reporting of the activity is normally returned from the access device(s) (e.g. 170, 175) to the master DASA database (110), which also provides for logging the data, meta-data and associated information to the external logging and monitoring database (105).

Figure 1A:
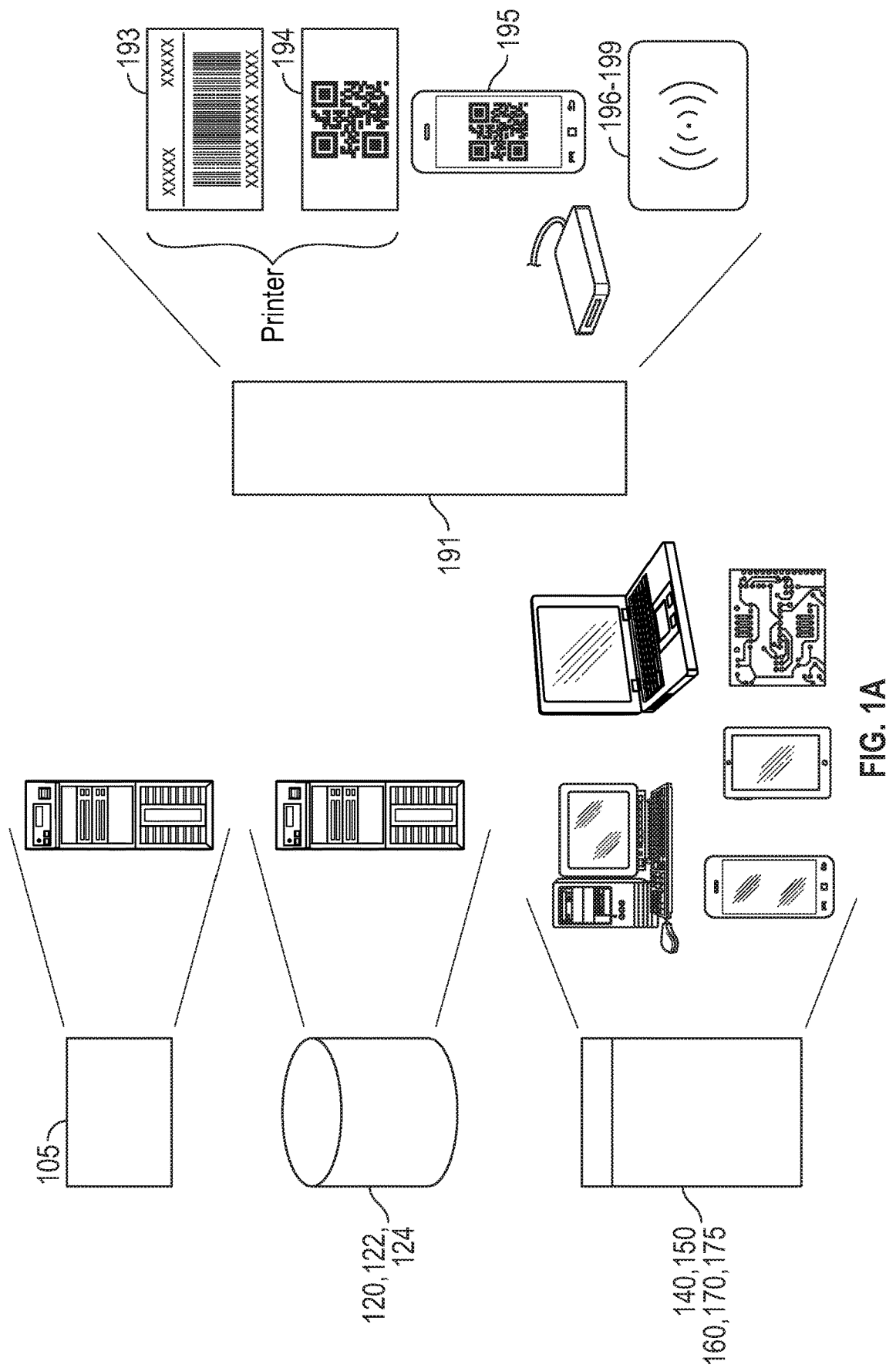
FIG. 1A is a schematic diagram that further illustrates and demonstrates actual and various devices using exploded views depicted in FIG. 1.

FIG. 1A further illustrates and demonstrates actual and various devices using exploded view callouts from that depicted in the schematic diagram shown in FIG. 1 and described above. Specifically, (105), the monitoring database, is shown as linked, residing within, and/or processed by a server or other computer microprocessor(s). In addition, the DASA database (110) and/or partial DASA databases (120, 122, and 124) are linked and communicate with the same or different (in some cases hardware) server(s) or other computer microprocessor(s). In addition, the multiple partial user devices U1, U2, U3 shown as (140), (150), and (160) respectfully, as well as the multiple partial access devices, (170), (175) are shown as one or more of several hardware devices including a desktop computer terminal and hard drive, a laptop computer, a cellular or smart phone, a tablet, such as an iPad®, and even a printed circuit board or integrated circuit (IC).

Further, elaborating on the virtual user device, U4 (190) as described above, can be created and are shown as real output device(s) (191) e.g. printers, scanners, tokens, stamps, RFID tags, (193,194) existing on or in cell phones or scanners (195) and/or functioning encoders, wave scanners, and/or electromagnetic devices (196-199). It is important to understand that these real devices can be used to create virtual user devices (U4).

Figure 2:
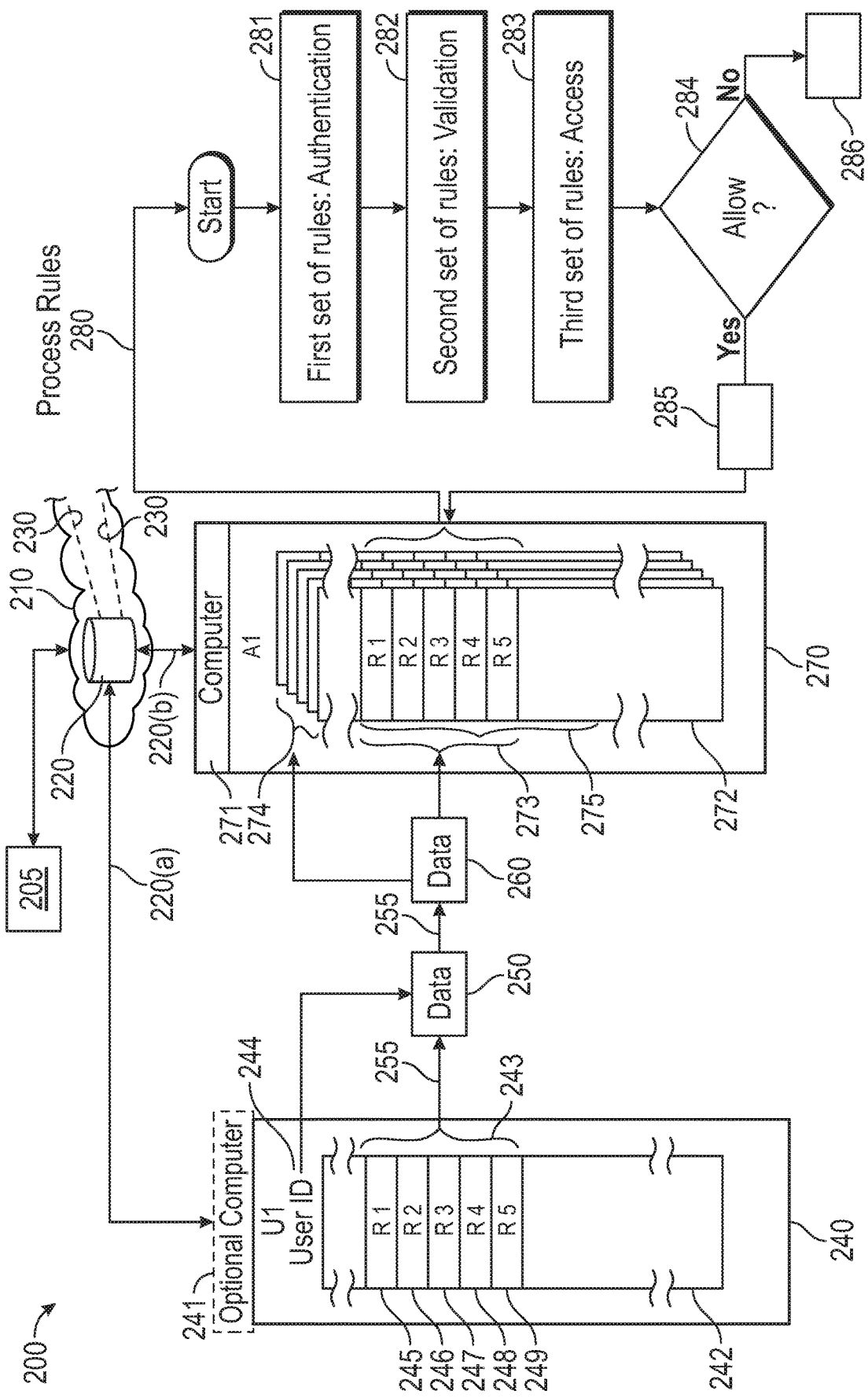
FIG. 2 is a schematic diagram that details a basic configuration regarding an example operation utilizing a real or virtual master DASA database shown as a partial cloud containing additional partial DASA databases wherein the partial DASA databases are capable of functioning in an independent and/or collaborative manner and also wherein the master DASA database and partial DASA databases allow for bi-directional transmission of data.

FIG. 2 is a schematic (200) that details a basic configuration regarding an example operation utilizing a real or virtual master DASA database (210) shown as a partial cloud containing additional partial DASA databases (220) wherein the partial DASA databases are capable of functioning in an independent and/or collaborative manner (230), wherein the master DASA database (210) and partial DASA databases (220) allow for bi-directional transmission of data, shown as (220 a and 220 b).

In this case, a single partial user device, U1, (240), includes 5 records (R1 245, R2 246, R3 247, R4 248, R5 249). The user device (U1) contains optional computing capability (241) and also contains a user ID (244). The 5 records in this case represent a designated portion of records (243) that together are a designated portion of a real or virtual, fuller list of records (242). The records (R1 245, R2 246, R3 247, R4 248, R5 249) minimally contain transaction sequence codes (TS codes) from the partial DASA databases (220). When the user device (240) requests access, the user device (240) includes a transmitter (250) that transmits data (255). The transmitted data (255) consists of an identifier of the specific user access device with its user ID (244) and the specific TS code contained in the most current record, R1, (245) in the designated portion (243). The transmitted data (255) not only contains user ID (244) and TS code(s) but also may comprise meta-data as well as additional information before, during, and after data transmission.

The transmitted data (255) is received by a receiver (260) that provides reception for a data transmitter (250) of an access device (270). The access device includes a computing portion (271) and a partial list of multiple real or virtual records (272) from the partial DASA databases (220). The received data from the receiver (260) is retrieved, analyzed, and acted upon by the computing portion (271). The User ID portion (244) of the data is used to select a specific record (274) from the partial list of multiple real or virtual records (272).

At this point, process rules (280) regarding authentication, validation, and access are invoked. The first set of rules for authentication (281) begin by taking the TS code(s) from the data which is next compared to TS code(s) in the designated portion of the specific record (273). This procedure corresponds to what is often referred to as a "dynamic table look-up" methodology. In contrast, if the TS (transaction specific) code(s) are not found, the record match fails, and then further authentication processes may be invoked.

Authentication can also include broadening/expanding of the designated portion (273) and searching for a match in the broader designated portion (275). It is possible to request multiple TS codes from the user device (240) using bi-directional transmission of signals to communicate and ensure that proper authentication is maintained.

In addition, it is possible to mark the currently used matched record as the beginning of the new designated portion, thereby synchronizing and constantly changing the designated portion (273) of the records (272) of the access device (270) with the user device (240) and voiding the use of all earlier records for a specific user device (240)

If all of the authentication processing fails, then the process rules flow truncates and optionally the user device (240) is notified.

When the authentication (281) is completed, validation (282) begins. If a match of TS codes in the designated portion (273) are found and the record (274) has not been utilized or utilized less than n times, validation (282) continues.

As validation (282) continues, it is useful to indicate that a matching record has been utilized and the "n" times counter begins to increment. In this instance, temporal codes stored in the user's record (274) may be compared with other items including; related temporal events, the last attempt to validate, the last attempt to access, and other possible options. Validation (282) requires retrieving, analyzing, utilizing, and storing a subset of data from the user record (274) that is subsequently changed when validation (282) of specific data within the subset occurs. The subset of data from the user may contain biometric, financial, medical, challenge responses, and the like. Successful validation (282) provides allowance to attempt access (283). After authentication (281) and validation (282) a third set of rules, access (283) are invoked, so that access and denial is a recorded event that is stored and resides within a user record (274). The recorded event can be stored in the logging and monitoring database (205) that is separate from the master (210) and partial (220) DASA databases. Here, n numbers of events influence future access and denial of a specified set of users. After n events, access is denied (284) until temporal rules re-enable access (286). In the case of access being allowed (285), temporal access rules are invoked via utilization of elapsed time that is accessed from the user device (240) the access device (270), or an external source capable of temporal measurement. Temporal rules are invoked via utilization of calendrical and associated clock time accessed from either the user device (240), the access device (270), or an external source. If access to the specified set of users is allowed but the specified set of users decides not to gain access (285), use of an entry code is not reusable and if entry is provided but not utilized (285), eventually too many access attempts are recorded, resulting in denial of access.

Each attempt for access causes a new TS code be provided from the user device (240) and provides for each attempt. The third set of rules provide degrees of access that result in either incomplete or partial access. Also, the third set of rules is combined with using logic embedded within the user devices (240) or the access devices (270) or both, wherein the user devices (240) and/or the access devices (270) are smart devices in that the smart devices are capable of at least one of a set of functions selected from a group consisting of; acquisition, analysis, storage, and retrieval of the data.

During the processing, or at the completion of the process rules (280), the records in the access device(s) (270) are updated with the process progress. The user record(s) (274) is updated and provided back to the partial DASA database (220). This update may then be provided to the logging and monitoring database (205). In addition, the user device(s) (240) could act as smart devices with a computer that updates the partial DASA database (220) and likewise the update may then be provided to the logging and monitoring database (205).

Figure 3:
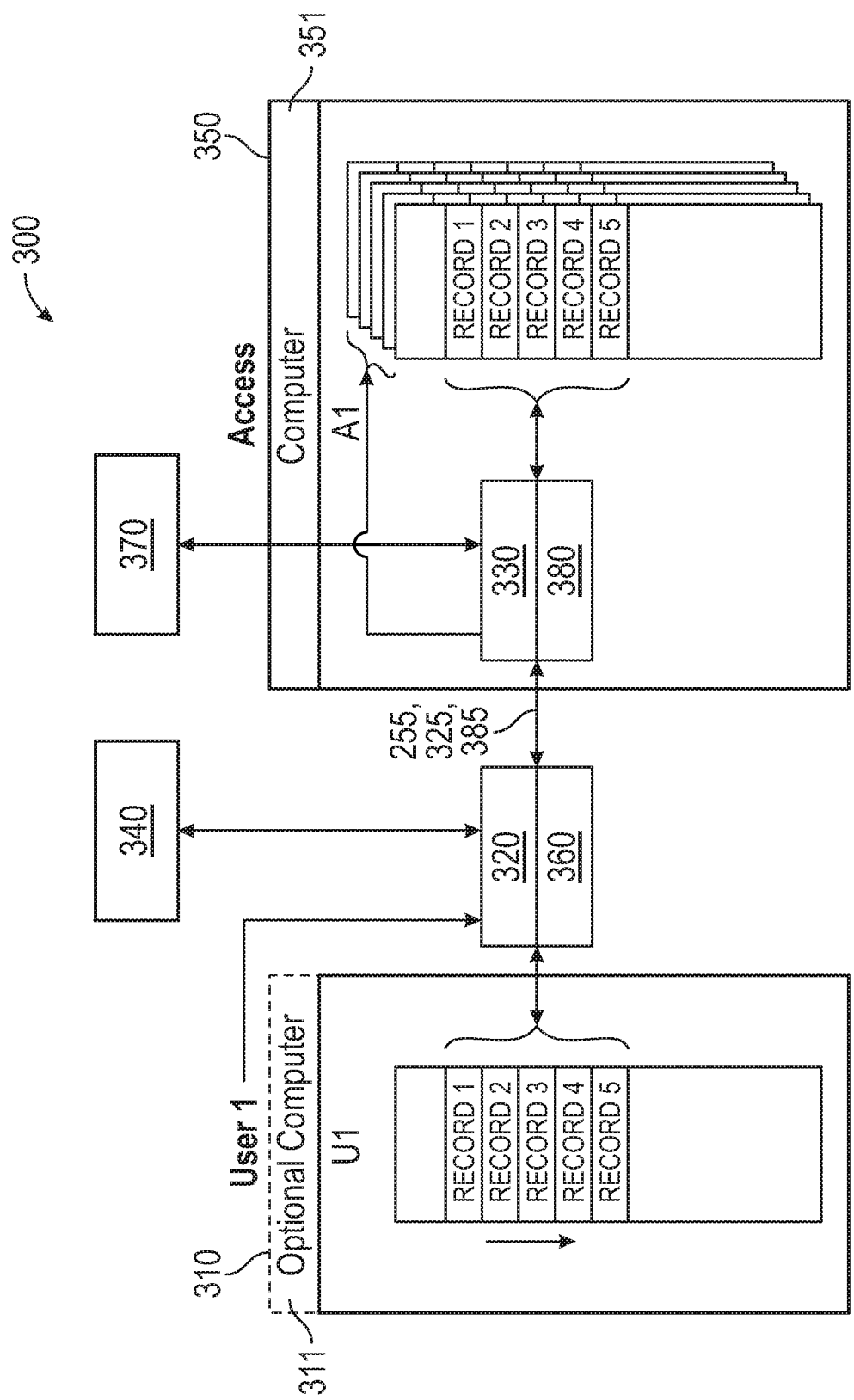
FIG. 3 is a schematic diagram that describes bi-directional communication between a user device U1 and an access device A1 where the user device U1 must include at least one computer. In the case of FIG. 3, the bi-directional access control system provides bi-directional transmissions connected to the DASA databases.

FIG. 3 is a schematic that describes bi-directional communication between user device U1 (310) which corresponds to (240) in FIG. 2 and an access device A1 (350) which corresponds with (270) in FIG. 2, wherein the user device U1 (310) must include at least one computer (311). In the case of FIG. 3, the bi-directional access control system (300) provides bi-directional transmissions connected to the DASA databases as described in FIGS. 1 and 2 above. In this case, transmitted data (255, as shown in FIG. 2) is transmitted between two controller devices (310,350), either one of which may be a user and/or access device with computers (311, 351). In order to function, controller device (310) includes a transmitter (320), a receiver (330) and rules processor (340) that may or may not utilize computer (311). Likewise, in order to function, controller device (350) includes a transmitter (380), a receiver (360) and rules processor (370) that may or may not utilize a computer (351). Controller (310) assembles data beginning in the transmitter (320) and transmits the data (255) as signals in transmission path (325) which are received by controller's (350) receiver (330) and processed by rules processor (370).

Also shown, is another controller (350) that assembles data in the transmitter (380) and transmits the data (255) as signals in transmission path (385) which are received by controller's (310) receiver (360) and processed by rules processor (340).

The data flow direction will be specific to the requirements of the system (300) and normally different data will be transmitted (255) and processed under a different set of rules created and processed by the rules processor(s) (340, 370). This system (300) provides a full-duplex arrangement allowing for data (255) flow in each direction simultaneously over two separate data paths (325, 385) which may exist in the same virtual/physical/real space or different virtual/real/physical spaces.

Figure 4:
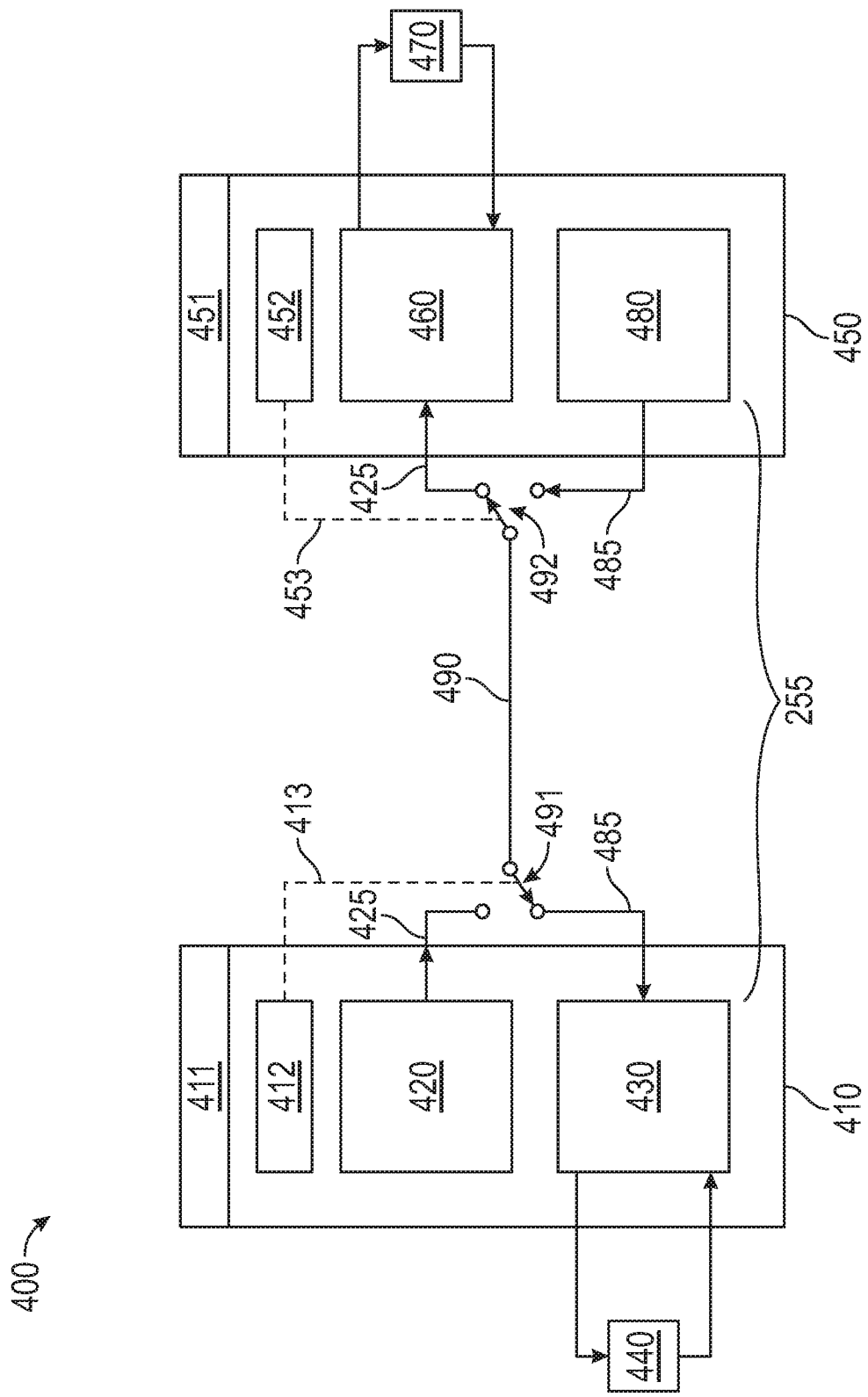
FIG. 4 is a schematic diagram that illustrates a half-duplex arrangement such that the bi-directional access control system continues to provide directional transmissions connected to the DASA databases as described in FIGS. 1 and 2. For FIG. 4, the data is transmitted here between two controller devices either one of which may function as a user and/or access device with computers. At least one controller device includes a transmitter, a receiver, and a computing operations processor that may or may not utilize a computer.

In FIG. 4, for a half-duplex arrangement, the bi-directional access control system (400) provides bi-directional transmissions connected to the DASA databases as described in FIGS. 1 and 2 above. This system (400) operates in a similar manner to that described in FIG. 3, system (300). As shown in FIG. 2, data is transmitted (255), here between two controller devices (410,450), either one of which may function as a user and/or access device with computers (411, 451). In order to properly function, controller device (410) includes a transmitter (420), a receiver (430) and rules processor (440), that may or may not utilize computer (411). Controller device (410) also includes a data path controller (412) with a data path switch (491). The control line (413) is the connection that controls the position of data path switch (491). Here, the controller device (450) includes a transmitter (480), a receiver (460) and rules processor (470) that may or may not utilize computer (451). Controller device (450) also includes a data path controller (452) and data path switch (492). The control line (453) is the connection that controls the position of data path switch (492).

The data path controllers (412, 452) are used to change the path direction from the default receive direction to the transmit direction utilizing the data path switches (491 and 492). This allows for the data path (490) to operate in a bi-directional manner, with the caveat that the data (255) traffic continues along a unidirectional flow path at any given instance. In this manner a controller device (410, 450) can either transmit or receive in one direction at a time but never simultaneously transmit and receive. The data path switches (412 and 452) in their normal default positions connect each of their respective receivers (430 and 460) in the default receive data positions. This embodiment allows the controller devices (410, 450) to receive transmissions on a continuous basis.

When the controller device (410) is called upon to transmit data (255), the data path controller (412) ensures that no data is currently being received by the receiver (460) and the data path switch (491) is switched to the data transmit position which connects data path (425) to bi-directional data path (490). In addition, data path controller (452) keeps its data path switch in the default data path receive position, connecting bi-directional data path (490) to data path (425) which is connected to receiver (460).

Controller (410) assembles data beginning in the transmitter (420) and transmits the data (255) as signals in the now longer transmission path. These signals that are now traveling along a longer transmission path that is followed and starts at 425 (the initial data path) continues thru 491 (a first data path switch), 490 (the bi-directional data path), and 492 (a second data path switch) and then back to 425 again, which is the initial data path ending at receiver (460) and processed by rules processor (470) as previously described in FIG. 2 and more detailed within this specification.

When the controller device (450) is called upon to transmit data (255) the data path controller (452) ensures that no data is being currently received by the receiver (480) and that data path switch (492) is switched to the data transmit position which connects data path (485) to bi-directional data path (490). In addition, data path controller (412) keeps its data path switch in the default data path receive position, connecting bi-directional data path (490) to data path (485) which is connected to receiver (430).

Controller (450) assembles data as described in FIG. 2 and transmits the data (255) via transmitter (480) as signals are now traveling along a longer transmission path such that the path followed starts at 485 (the initial data path) continues thru (492), a first data path switch, (490) the bi-directional data path, and (491), a second data path switch, and then back to (485) again, which is the initial data path ending at receiver (430) and processed by rules processor (440).

The data flow direction will be specific to the requirements of the system (400) and normally different data will be transmitted (255) and processed under a different set of rules processed by the rules processors (440, 470). This system provides a half-duplex arrangement allowing for data in each direction over a single data path which may exist in the same virtual/physical/real space or different virtual/real/physical spaces.

Encryption

For a system with at least one encryption application existing for master and/or partial DASA databases, the encryption application possesses one or more keys. Data transmission from the user device(s) are encrypted with keys. The data transmission is received by the access devices and decrypted with the keys. The identical keys are utilized if the encryption is symmetric and different keys are utilized if the encryption is as asymmetric.

One or more keys are generated with one or more algorithms from a subset of data with user specific information existing within a designated portion of the user's record of the DASA databases (master or partial) such that authentication is implemented according to the first set of authentication rules described above. The encryption levels are more specifically described in FIGS. 5, 5A, 5B, 5C, and FIG. 6 and include as the first set of computer operations with rules for both encryption and decryption.

The encryption application(s) are secured in one or more secured databases, within a secured cloud, or other secured computer aided storage system(s) that utilize one or more of the group selected from a data memory storage device, a database, a computer accessible cloud, a network, internet, intranet, and/or at least one server.

One or more encryption applications are employed together with the securitization system described in FIGS. 1-4 above, utilizing one or more DASA databases. The at least single level of encryption process is as follows;

a first level of encryption and decryption of data transmission utilizing keys wherein a first set of encryption keys exist and are retrieved from one or more encryption applications, the applications existing within one or more memory storage devices or databases that individually, collectively and/or collaboratively contain the encryption keys, wherein a user accesses and utilizes at least a single key that exists in both one or more user devices and one or more access devices via utilization of (DASA) databases that exists for and are accessible by both virtual and real user devices and the associated access devices, wherein at least a single key exists within all devices, thereby alleviating a need to distinguish between user ID's;

a second level of encryption and decryption of data transmission utilizing keys wherein at least one user ID is attached to the data and wherein the user ID must be placed within an unencrypted portion of the data such that the user can access and acquire at least one key from the user record but not out of the encryption application, such that every user possesses their own key and an unencrypted user ID in received data that is utilized to select one or more user's data records such that at least one key from one or more user's data records is utilized; and wherein the user ID attached to the data is attached via a tag of the data and;

wherein a third level of encryption and decryption of data transmission utilizing keys provides for multiple user records that exist for multiple users wherein the user can access and acquire keys wherein the keys residing within the DASA database(s) are constantly changing thereby requiring smart user devices that can utilize constantly changing keys;

a fourth level of encryption and decryption of data transmission utilizing keys wherein the keys are located in an expanded data record field within a range of data records so that the designated portion of the expanded data record field is utilized wherein the keys are in a first record of the designated portion, thereby providing one or more unique keys for each and every data transmission.

In at least this instance, this 4th level of encryption includes a designated portion which is also constantly changing.

A fifth level of encryption and decryption of data transmission utilizes keys such that algorithms produce keys from any combination of a group consisting of; record numbers, recorded time, and random numbers associated with one or more user records and wherein one or more algorithm produced keys exist and allow for generation of an identical key using an identical algorithm for decryption. In this instance, a specific group of numbers are being accessed and taken from the user record and transmitted to the access device.

For this fifth level of encryption these one or more algorithm produced keys exist within at least one of the DASA databases. Here, in each and every instance of transmitting data, a new set of keys (one or more pairs) can be generated without transmitting a new set of keys from the user device(s) to the access device(s). In the absence of transmission of the new set of keys, it is impossible for interception of the new set of keys without access to any of the DASA databases (which themselves may be encrypted).

In fact, for all levels of encryption, if data fields are picked that are changed during use of the user device(s), it is impossible to intercept the keys without access to the DASA databases.

The DASA databases themselves are encrypted to protect against unauthorized access. The DASA databases are protected by utilizing a system key for each user to be allowed access to the overall system. Each attempt for access may cause a new TS code be provided from the user device (240 in FIG. 2) and provides for each attempt, thereby each attempt results in an ability to encrypt a different encryption for and of the data, the data transmission, and the new code.

Figure 5:
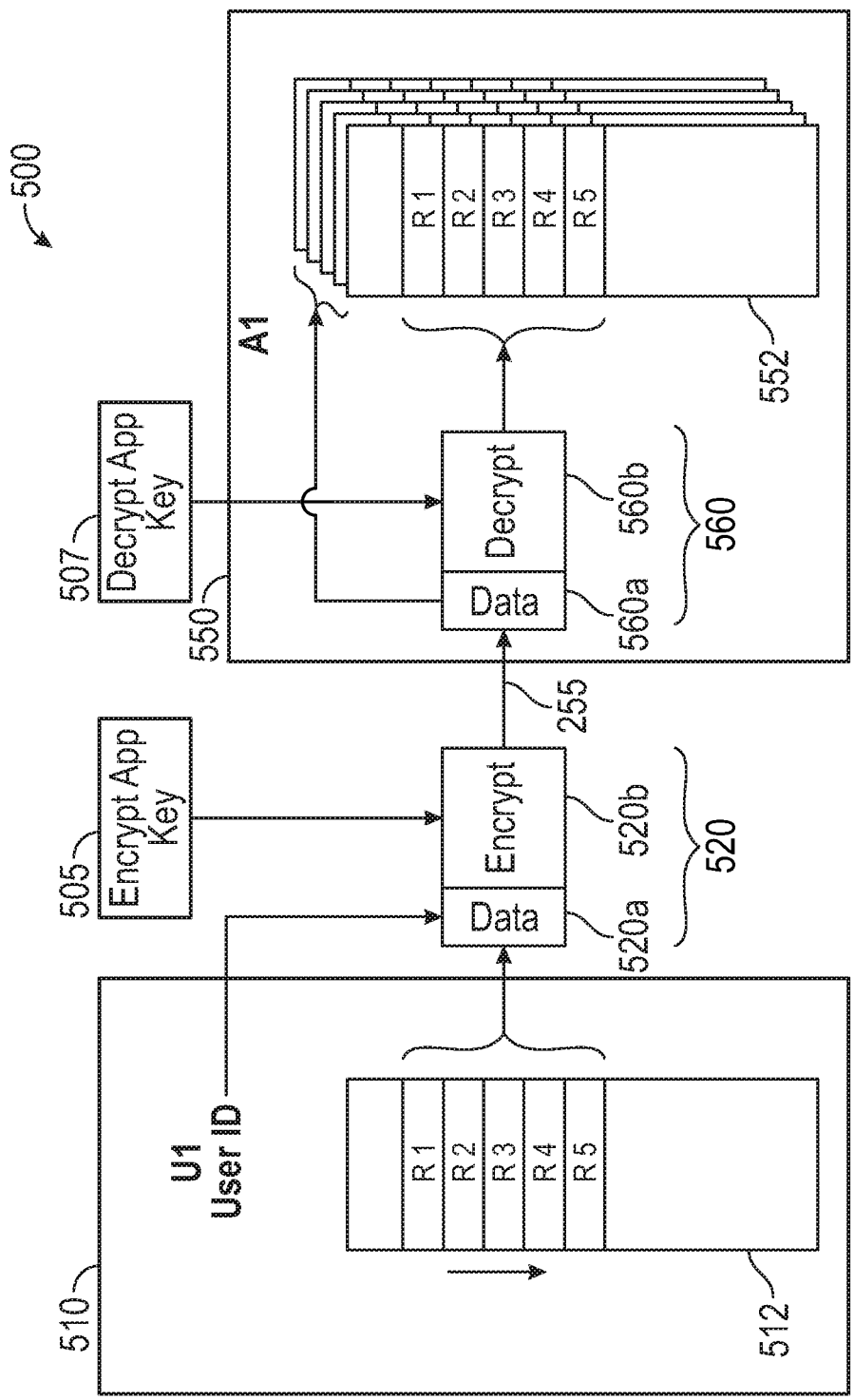
FIG. 5 is a diagram that depicts a system detailing the first level of encryption and decryption of data transmission with and for one or more user device(s) and access device(s) utilizing one or more keys such that a first set of encryption keys exist and are used by one or more encryption/decryption applications. In this instance, the encryption application key resides in the memory of user device(s). Likewise, the decryption application key resides in the existing access device.

FIG. 5 depicts a system detailing the first level of encryption and decryption of data transmission (500) with and for one or more user device(s) (510) and access device(s) (550) utilizing one or more keys (505, 507) such that a first set of encryption keys exist and are used by one or more encryption (520)/decryption (560) applications. In this instance, the encryption application key (505) resides in the memory of user device(s) (510). Likewise, the decryption application key (507) resides in the existing access device (550). The user device (510) accesses and utilizes at least a single key (505) that exists in one or more user devices (510) and one or more access devices (550) via utilization of (DASA) databases that exists for and are accessible by both virtual and real user devices (510) and the associated access devices (550), wherein at least a single key (505, 507) exists within all devices, thereby alleviating a need to distinguish between user ID's. The encryption keys (505, 507) are identical if symmetric encryption is utilized and different when asymmetric encryption is utilized.

As further detailed in FIG. 5, the transmitter (520) contains transmitter data memory (520a) with a transmitter encryption application (520b). The receiver (560) contains receiver data memory (560a) and receiver decryption application (560b). This basic system includes user device(s) (510) that contain single file records (512) with data that is transmitted (255) via signals to the transmitter (520) and the receiver (560) of access device(s) (550) that can contain multiple files within multiple records (552). The signals carrying the data from the data memory (520a) once passed through the transmitter encryption application (520b) are transmitted via data transmission (255) to the receiver (560). The receiver (560) receives the data in the receiver data memory (560a) and decrypts the data in the receiver decryption application (560b).

Figure 5A:
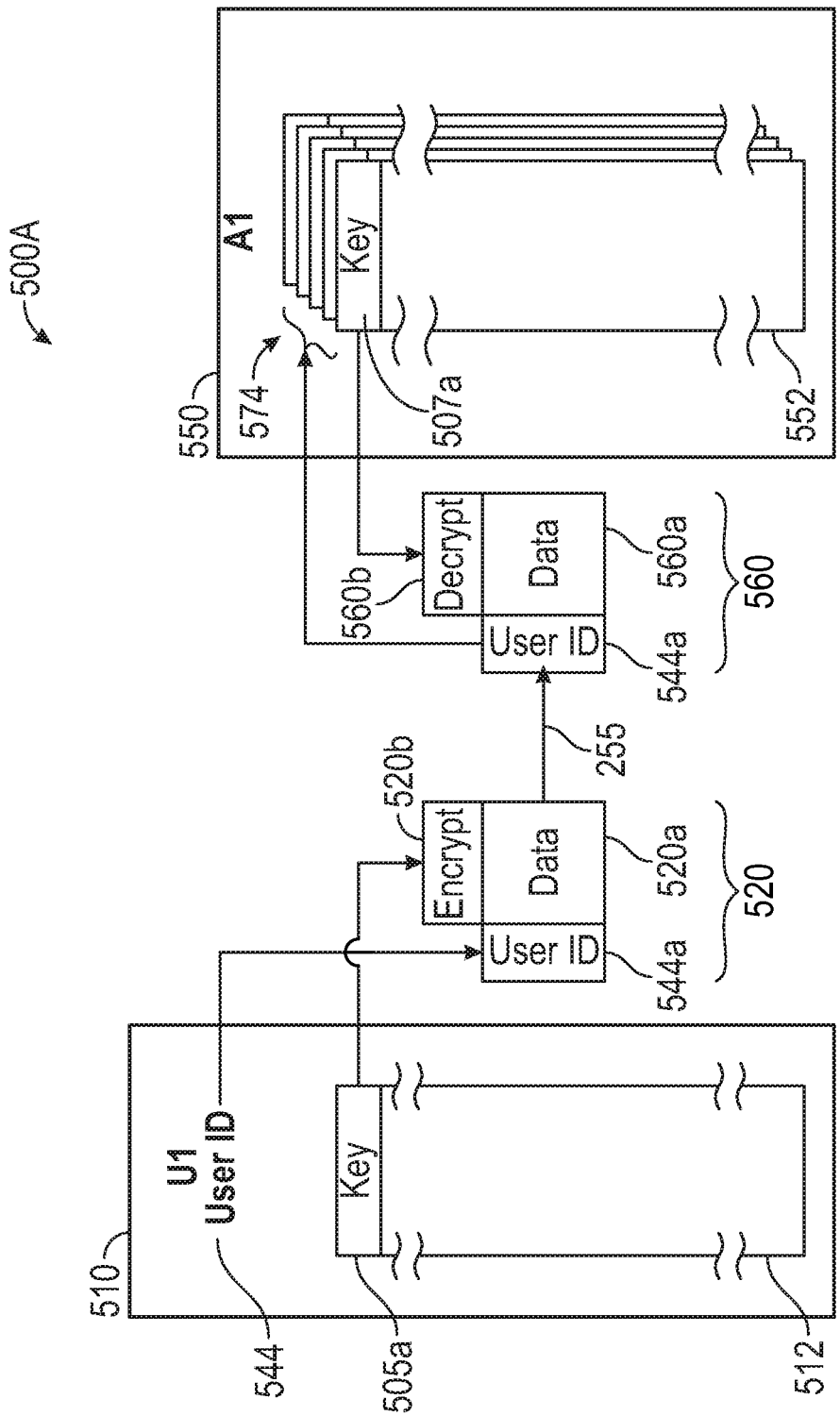
FIG. 5A is a schematic diagram indicating the functionality of the second and third levels of encryption and decryption of data transmission.

FIG. 5A is a schematic diagram indicating the functionality of the second and third levels of encryption and decryption of data transmission (500A). For the second level, the following process begins with utilizing encryption key 505a which is placed in the user device (510) memory as one or more static elements within single file records (512). Encryption key 507 is placed in the access device (550) memory as multiple static elements within one of multiple file records (552) selected by record selector user ID (574). Selected multiple record files (552) corresponds with user device U1 (510), record (512), such that encryption keys 505a and 507a are an encryption key pair. At this level, at least one user ID, U1 (544) is attached to the data transmission memory (520a). Here, the user ID (544) must be placed within an unencrypted portion of the transmitter data memory (520a). To initiate the transmission process, data (520a) is placed in the transmitter memory (520). Next, key (505a) is used by encryption application (520b) to encrypt data (520a). User ID (544) is added as a tag (544a) to unencrypted transmitter memory. Transmission of encrypted data (520a) and unencrypted user ID tag (544a) is sent to via data transmission of signals (255) to receiver (560). User ID tag (544a) then acts as a record selector user ID (574). This provides access to the decryption key, (507a). This key (507a) is used by the decryption application (560b) to decrypt data (560a) in the receiver (560). In this manner, it is now possible to provide a unique key pair for each user device.

The third level of encryption is identical to that of the second level with the exception that utilizing encryption key 505a which is placed in the user device (510) memory is one or more dynamic elements within single file records (512). Encryption key (507a) is placed in the access device (550) memory as multiple dynamic elements within one of multiple file records (552) selected by record selector user ID (574). Selected multiple record files (552) still correspond with user device U1 (510), record (512), such that encryption keys (505a) and (507a) remain an encryption key pair. For this third level of encryption and decryption of data transmission the keys (505a and 507a) which are now dynamic keys residing within one or more DASA databases and are constantly changing. This now requires smart user devices that can distinguish between keys.

Figure 5B:
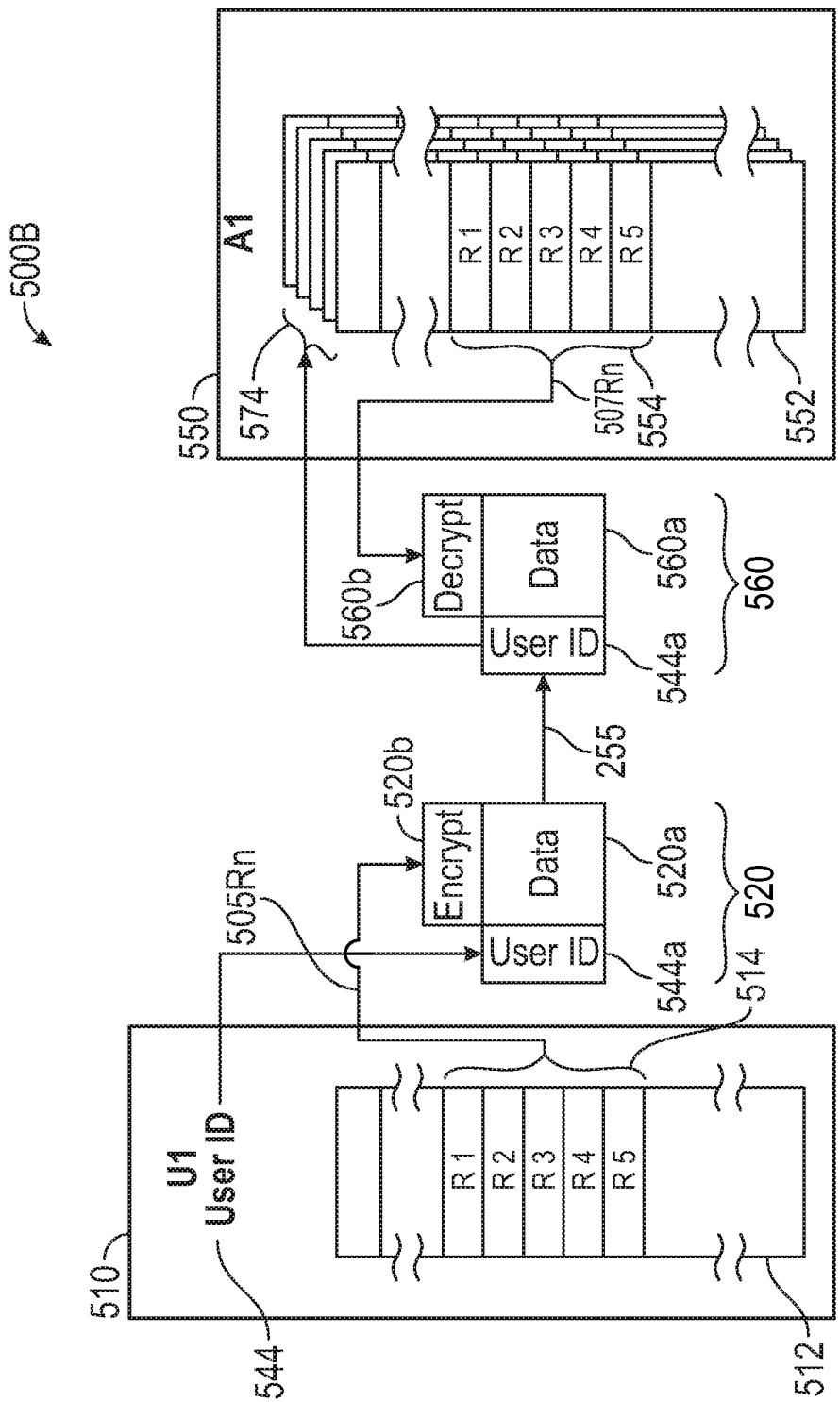
FIG. 5B is a schematic diagram indicating the functionality of the fourth level of encryption and decryption of data transmission utilizing keys.

FIG. 5B is a schematic diagram indicating the functionality of the fourth level of encryption and decryption of data transmission utilizing keys (500B). At this level, encryption key (505a) no longer exists but instead encryption keys (505Rn) are selected from one or more records residing in the user device (510) within single file record (512) with designated portion (514) as these encryption keys (505Rn) can be constantly changing. Likewise, decryption key (507a) no longer exists, but instead decryption keys (507Rn) are selected from access device (550) memory within one of multiple file records (552) selected by record selector user ID (574) with designated portion (554) which corresponds, in that, it possesses identical keys to those of single file record (512). This technique provides for encryption and decryption of the authentication process. More specifically, for every transaction that occurs, a new encryption key is used by selecting keys from different records of an expanded record field from either the user device or access device or both. In addition, TS codes can be utilized in combination with the encryption keys to further authenticate each transaction. This provides for continuously changing authentication and encryption. In some cases, this 4th level of encryption includes a designated portion (514, 554) which is also constantly changing. The DASA databases themselves are encrypted to protect against unauthorized access. The DASA databases are protected by utilizing a system key for each user to be allowed access to the overall system. Each attempt for access may cause a new TS code be provided from the user device (240 in FIG. 2) thereby each attempt results in an ability to encrypt a different encryption for and of the data, the data transmission, and the new code.

Figure 5C:
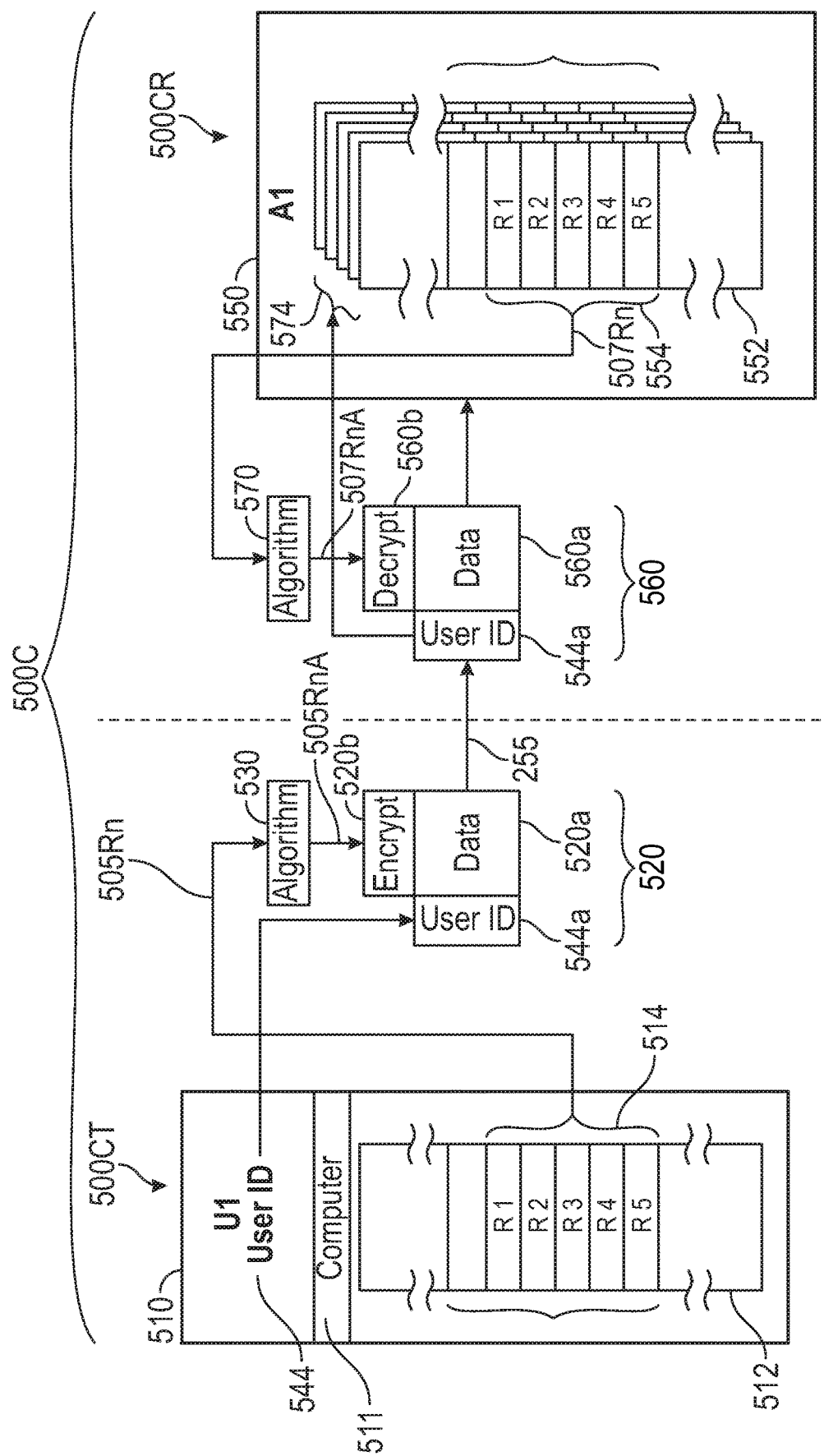
FIG. 5C is a schematic diagram indicating the functionality of the fifth level of encryption (500 C) which has additional features added to the fourth level of encryption.

FIG. 5C is a schematic diagram indicating the functionality of the fifth level of encryption (500 C) which has additional features added to the fourth level of encryption. In this case 500 CT refers to the transmission portion of this 5th level and 500CR corresponds with the receiving portion of level 5. One feature is the use of an algorithm (530, 570) for both the user device(s) (510) and access device(s) (550) that adds another level of sophistication to keys by generating a series of algorithmically created keys (505RnA, 507RnA). Algorithm generator (530) receives key (505Rn) and computes via an algorithm a new key (505RnA) is generated which is used by encryption application (520b). Similarly, algorithm generator (570) receives key (507Rn) and computes via an algorithm a new key (507RnA) that is generated and which is used by decryption application (560b). Each newly created key is applied to a sub-portion of the data, thereby increasing protection for the overall system. Algorithm generators (530,570) can produce keys from any combination of a group consisting of; record numbers, recorded time, and random numbers associated with a user record (512) and/or access record (552). These newly created keys from the record are applied to the data by adding more key bits. In this instance the algorithm is expanding the effective size of the keys.

Here, in each and every instance of transmitting data (255), a new set of keys (one or more pairs) (505RnA, 507 RnA) can be generated without requiring transmission of these new set of keys from the user device(s) (510) to the access device(s) (550). In the absence of transmission of the new set of keys (505RnA, 507 RnA), it is impossible for interception of the new set of keys.

An additional feature for this fifth encryption level involves the addition of a computer (511) to control the user device(s) (510) to provide algorithm computation capabilities. The fifth level of encryption includes the possibility of supplying one or more algorithm produced keys from one or more DASA databases. In the absence of transmission of the new set of keys it is impossible for interception of the new set of keys without access to the DASA database. In addition, for all levels of encryption (levels 1-5 as described in FIGS. 5A-C), if data fields are picked that are changed during use of said user device, it is impossible to intercept said keys without access to said DASA database.

Figure 6:
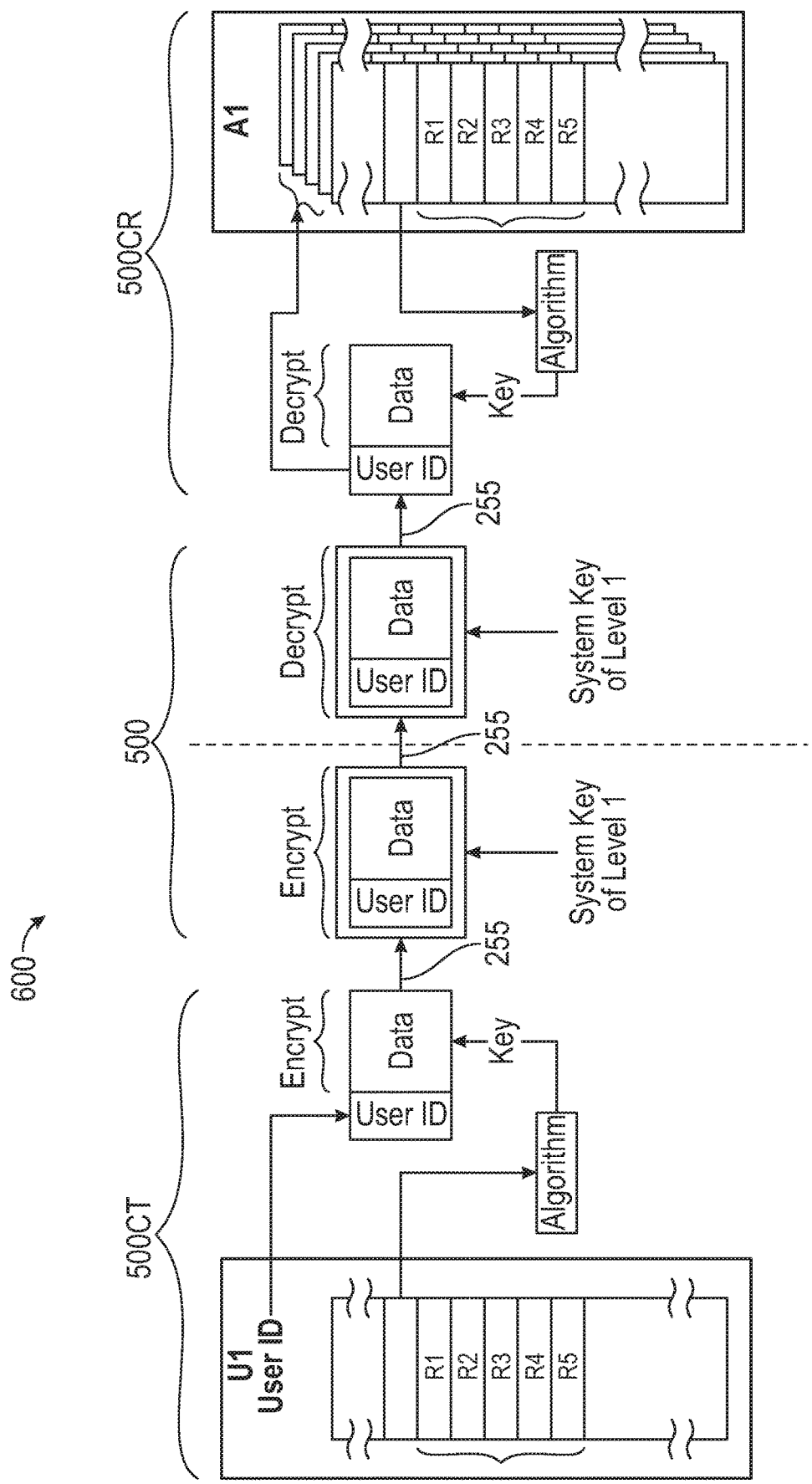
FIG. 6 is a diagram that depicts a system with an overlapping or layered set of encryption levels.

FIG. 6 depicts a system with an overlapping or layered set of encryption levels (600). In this example, the 5th level of encryption is first invoked (500CT), followed by taking the transmitted encrypted data (255) produced by the 5th level of encryption (500CT) that is followed by further encryption utilizing the 1st level of encryption (500). The transmitted data (255) is then further transmitted to the receiving device that utilizes the first level decryption of the first level encryption (500) to decrypt the data. This data is again transmitted (255) to the receiving portion (500CR) which subsequently decrypts the fifth level of encryption. The purpose for this technique is that levels 2-5 as provided herein, do not encrypt the user ID tag, however the first level described encrypts all the data, thereby securing the user ID tag for levels 2-5 (all levels of encryption).

Mesh Networks

Figure 7:
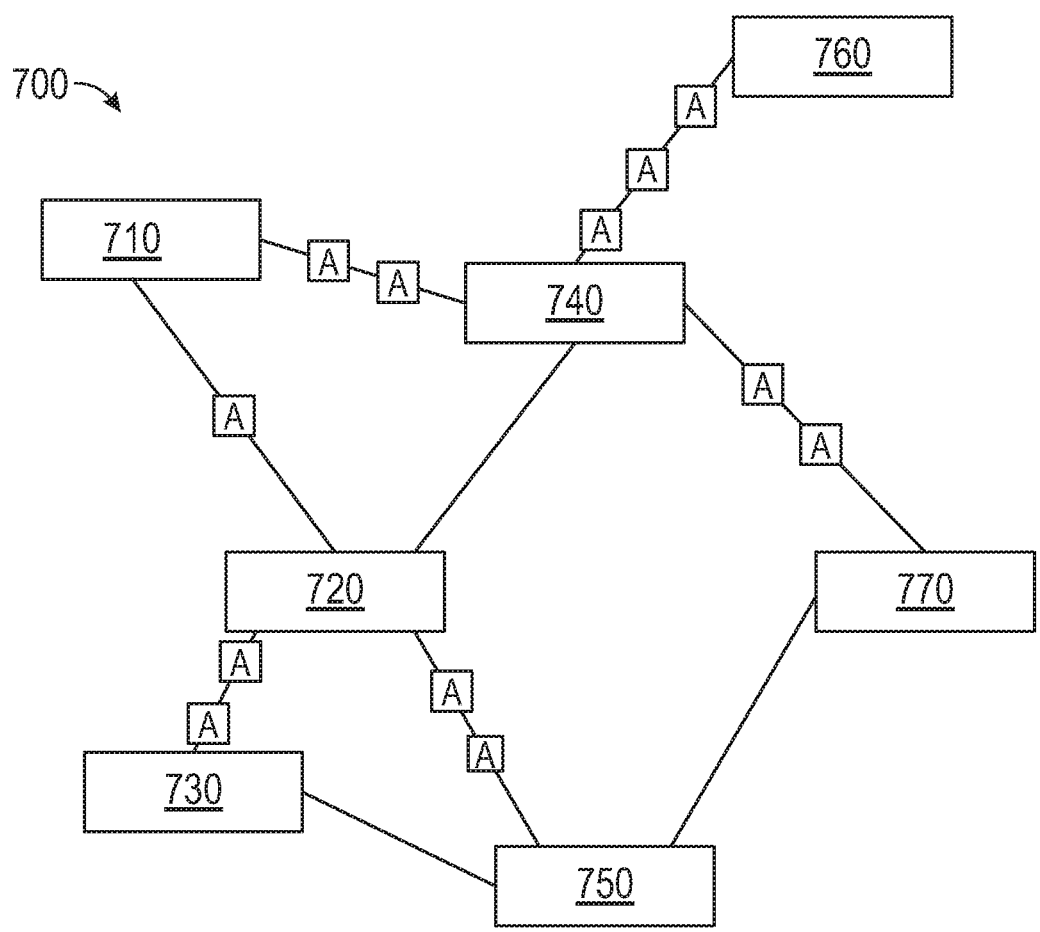
FIG. 7 is a schematic representation of a mesh network that coordinates multiple securitization systems (as described in FIGS. 1-4) that are networked so that they may communicate with one another.

FIG. 7 is a schematic representation of a mesh network that coordinates multiple securitization systems (as described in FIGS. 1-4) that are networked so that they may communicate with one another. The DASA databases as well as user and access devices may be connected together as a mesh network utilizing one to one and/or one to many and/or many to many data connections. For FIG. 7, items 710, 720, 730,740, 750, 760, and 770 represent DASA databases, user devices and/or access devices as previously described. In order to route data through one or more of these devices, additional routing software and computational capability is required. For example, the connection from 740 to 760 indicates a one-to-one data communication connection. In another case, a "one to many" communication connection exists from 710 to 720 as well as from 710 to 740. A further example of a "many to many" connection is depicted as communication data connections from 720 to the list of 710,730, 740 and 750. Data communication amplifiers, repeaters, and/or range extenders which optionally assist in ensuring signal integrity and strength, over various communication distances are depicted as small boxes with a designated "A" which are located in the data communication flow paths connecting the DASA databases, user devices, and/or access devices. These amplifiers are provided to complete the mesh network as required. These connections may or may not be encrypted with either our five level encryption technology or with those of others. These connections may also be full or half-duplex systems as described in FIGS. 3 and 4 respectively.

The mesh network can route signals redundantly in the case of poor or broken connections. By doing so, the network provides the additional benefit of increasing reliability and speed of data transmission as well as ensuring our securitization and encryption system is viable. Data connection can be provided for peer-to-peer across the mesh network without the use of a central server. Without the use of a central server, encrypted data can be moved across redundant paths in the network utilizing peer-to-peer encryption from endpoint to endpoint without the need to decrypt and re-encrypt the data at any intermediate location along the data-path.

Specifically, in one situation, a user device (710) may communicate with an access device (770). This communication would normally travel the shortest route, connecting (710) through (740) to (770). If there are any data communications issues or interruptions or delays in a communication link for instance the link between (740) and (770) is not functioning, then the network would reroute the communications through an alternate (albeit longer) path. For example, the alternate path could be (710) to (740) to (720) to (730) to (750) to (770).

Figure 7A:
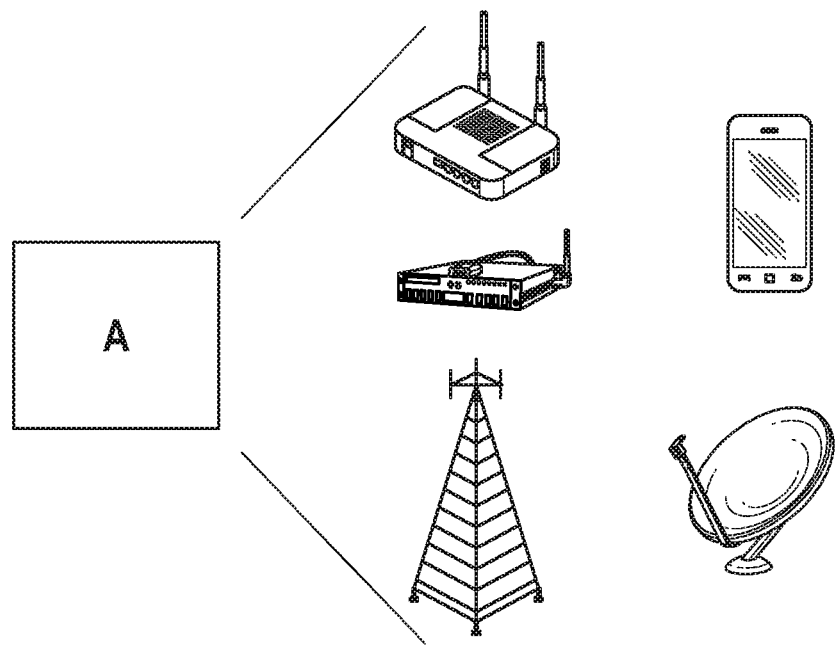
FIG. 7A is a schematic representation that further illustrates and demonstrates actual and various devices using exploded views to indicate the myriad of possible devices that are possible for use in the mesh network as well as throughout the FIGS. 1-6 of the present disclosure.
Figure 7A:
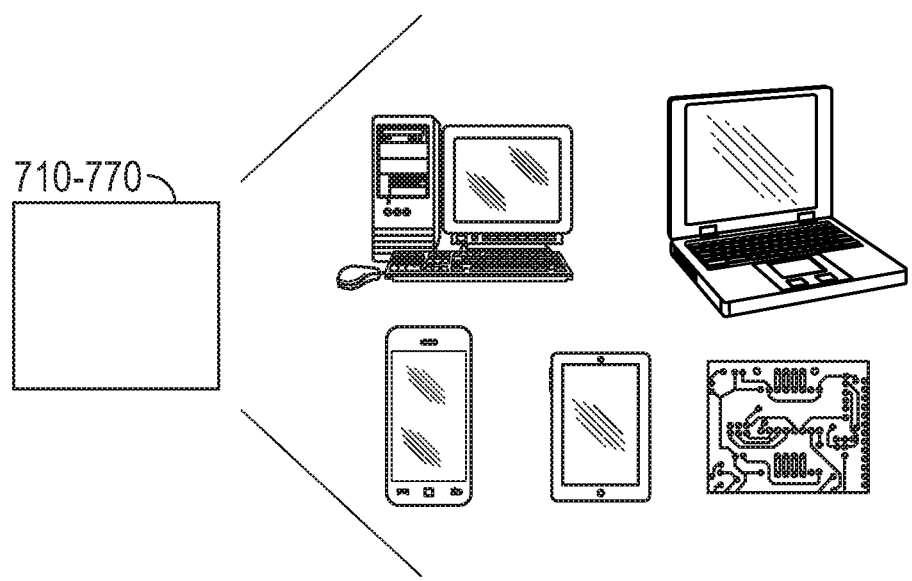

FIG. 7A further illustrates and demonstrates actual and various devices using exploded view callouts from that depicted in the schematic diagram shown in FIG. 7 and described above (in e.g. FIG. 1) For FIG. 7, items 710, 720, 730,740, 750, 760, and 770 (710-770) represent DASA databases, user devices and/or access devices as desktop or stand-alone computer terminals replete with hard drives, laptop computers, cellular or smart telephones, computer tablets such as the iPad® and even printed circuit boards or integrated circuits (ICs). Further, elaborating on the virtual user device, U4 (190) as described above, can be created and are shown as real output device(s) (191) e.g. printers, scanners, tokens, stamps, RFID tags, (193,194) existing on or in cell phones or scanners (195) and/or functioning encoders, wave scanners, and/or electromagnetic devices (196-199). It remains important to understand that these real devices can be used to create virtual user devices (U4).

As stated above, the further example of a "many to many" connection was depicted as communication data connections from 720 to the list of 710,730, 740 and 750. Data communication amplifiers, repeaters, and/or range extenders which optionally assist in ensuring signal integrity and strength, over various communication distances are depicted as small boxes with a designated "A" which are located in the data communication flow paths connecting the DASA databases, user devices, and/or access devices. These amplifiers, repeaters, and/or range extenders are further depicted here in FIG. 7A using exploded view callouts for block A to illustrate the real devices that correspond to data communications devices including; wireless transmitters and receivers, conventional and dish type antennae, and even cellular or smart telephones. These devices are all used to complete the mesh network as required.

Tolerance

Further, the designated portion of a user's record can also include tolerance when data is in transit from the designated portion to the access device and wherein transit of the data is synchronized between the user device and the access device. According to the first set of rules defining authentication, this first set of rules also relates, corresponds with and can invoke tolerance rules that search for an access device's data record regarding data sent by the user device(s).

When the data in transit is not synchronous and when the data is transmitted outside of a predetermined and limited tolerance, no authentication can be achieved. When synchronization is not occurring, resynchronization is achieved by changing the designated portion during access to the access device(s) to match the designated portion of the user device(s), thereby achieving resynchronization.

When resynchronization occurs, the user ID is utilized to select the user record according to the third set of rules, thereby allowing the user record to be encrypted and produce one or more keys via one or more algorithms from a known portion of the DASA databases. The resynchronization routine recognizes a specified set of users to ensure proper resynchronization in order that the access device can properly allow or deny access for that specified set of users.

During a routine (process) of trying to authenticate, a user must decrypt each data record within the designated portion that possess its own unique key. This routine or process continues until the user finds a match of said data record with said key. Routine in this instance refers to the need for resynchronization and the actual process of resynchronization.

The tolerance for this access control system, provides a desired range within which the system will operate and the tolerance utilizes one or more record numbers generated and obtained via one or more algorithms that encrypt and decrypt random numbers.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

In addition, each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more access devices or one or more user devices or both one or more access devices and one or more user devices comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output devices, wherein said output devices are computing devices, wherein said one or more output devices create user devices, and wherein said master and said partial DASA databases for configure bi-directional transmission of data to and from multiple partial user devices, to and from multiple partial access devices or to and from both multiple partial user and multiple partial access devices, wherein said user devices and said access devices are computing devices, and wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users, wherein said master or partial DASA databases or both are encrypted to protect against unauthorized access of said DASA databases.

2. The one or more access devices and user devices of claim 1, wherein tolerance of said a designated portion of a user's record is provided when data is in transit from said designated portion to said partial access device and wherein transit of said data is synchronized between said partial user device and said partial access device and wherein said first set of computing operations also relate to, correspond with, or invoke tolerance computing operations that search for an access device's data record regarding data sent by said partial user devices.

3. The one or more access devices and user devices of claim 1, wherein when data in transit is asynchronous in that said data in transit is not exactly matched or in synchronization with data within or external to devices that said data in transit is transmitted to and wherein when said data in transit is transmitted outside of a predetermined and limited tolerance, no authentication associated with said data in transit can be achieved.

4. The one or more access devices and user devices of claim 3, wherein when synchronization is not occurring, resynchronization is achieved by changing a designated portion during access to said partial access devices to match said a designated portion of said partial user devices.

5. The one or more access devices and user devices of claim 4, wherein when resynchronization occurs a user ID is utilized to select a user record according to said third set of computing operations, thereby allowing said user record to be accessed from a known portion of one or more master or one or more partial DASA database(s) or both one or more master and one or more partial DASA databases and wherein resynchronization recognizes a specified set of users to ensure proper resynchronization in order that said partial access devices can allow or deny access for said specified set of users.

6. The one or more access devices and user devices of claim 1, wherein during a process authentication, a user or user's device decrypts each data record within a designated portion that possess its own unique key and wherein said process continues until said user finds a match of said data record with said key.

7. The one or more access devices and user devices of claim 1, wherein tolerance computing operations provides a desired range within which a system operates and said tolerance computing operations utilizes one or more record numbers via one or more distinct computing operations that encrypt and decrypt data.

8. The one or more access devices and user devices of claim 7, wherein said tolerance computing operations further comprise an increased in complexity by applying a check of additional records within a designated portion of said partial user and said partial access devices along with temporal limitations that limit authentication.

9. The one or more access devices and user devices of claim 1, wherein first attempts to access a secure device or secure location begins by acquisition of one or more keys that utilize a tolerance that provides for a number of attempts, (n), to retrieve keys from a configuration table wherein at least one encryption application with a get next key routine is invoked locally on or in proximity to said partial user devices to generate encryption keys and to generate a new master key and wherein simultaneous attempts are made to match a specific partial user's device user identification (ID) encryption keys with an encryption database derived from said user ID encryption keys by using a specific tolerance number or tolerance range selected from many numbers available through a number generator.

10. The one or more access devices and user devices of claim 9, wherein said at least one encryption application is added for layering security for said access devices, said user devices, and associated system so that a match is determined to establish whether a user of said partial user devices has access privileges.

11. The one or more access devices and user devices of claim 10, wherein encryption keys can be removed from a user table either, before, during, or after said match such that a key management system ensures that said encryption keys are neither discoverable nor compromised in that a user of said access devices, said user devices, and associated system cannot locate said encryption keys and further even if said encryption keys were located they could not be acted upon by said user.

12. The one or more access devices and user devices of claim 1, wherein said partial DASA databases include a list of identifiers and codes that reside in either said partial user devices or said partial access devices or within both said partial user devices and said partial access devices, such that said access devices and user devices includes a device that functions as two or more devices so that both a user device and another an access device, possess matching databases that communicate with each other and utilize one or more encryption applications.

13. The one or more access devices and user devices of claim 12, wherein said partial user devices communicate internally within said partial user devices and externally from said partial user devices by transmitting and receiving data utilizing one or more encryption applications and a secured location and wherein a reader device is a detecting device that searches, retrieves, and analyzes a recognizable securitized and encrypted data signal generated after installation of said encryption application is completed.

14. The one or more access devices and user devices of claim 13, wherein said transmitted and received data is comprised within a token and wherein said token is recognized by said reader device, said token controlling access to said partial user device, controlling access to said reader device and also controlling access to one or more locations.

15. The one or more access devices and user devices of claim 1, wherein a partial access device is a reader device and wherein said reader device can be a badge reader.

16. The one or more access devices and user devices of claim 1, wherein data is provided as code, said code selected from a group consisting of: a QR code, a bar code, a digital code, an analog code, and a 7-bit binary code and wherein said QR code when found by a partial access device is recognizable in that it is recognized by a user's cellular phone and allows access to a user identification (ID) encryption key from said QR code which is subsequently passed through at least one encryption application.

17. The one or more access devices and user devices of claim 16, wherein said QR code found by a partial access device is recognizable in that it is recognized by a user's cellular phone and allows access to a user identification (ID) encryption key from said QR code which is subsequently passed through at least one encryption application.

18. The one or more access devices and user devices of claim 1, wherein one or more partial user devices and one or more partial access devices are data transceiver devices and wherein said data transceiver devices are intelligent and one or more receivers are intelligent in that said data transceiver devices and said receivers are computerized and possess memory.

19. The one or more access devices and user devices of claim 18, wherein said data transceiver partial user device is selected from a group consisting of cellular phones, cameras, infrared transmitters, optical transmitters, WiFi transmitters, Bluetooth transmitters, ultra-wide band near-field transmitters, communication transmitters, radiation transmitting devices, magnetic strips, and smart chips and wherein said data transceiver partial user devices and data transceiver partial access devices comprise sensors selected from a group consisting of RFIDs, gyro sensors, magnetic field sensors, electromagnetic field sensors, electrical optical infrared sensors, radar sensors, lidar sensors, inclination accelerometers, inclinometers, cameras, and bio-sensors and wherein said data transceiver partial access devices are a cellular phone and wherein said data transceiver partial access devices are a cellular phone that can include a camera and wherein said cellular phone is a smart phone that can access, interact with, and display Internet provided data as well provide GPS guidance and allow for computational search, retrieval, and analysis of data derived from, residing within, or accessed by said smart phone.

20. The one or more access devices and user devices of claim 1, wherein said partial access devices are selected from a group consisting of: controllers and switches that control a flow of energy to and from devices including lights, transportation vehicles including aerospace vehicles, elevators and escalators, electrical switches, and electrical contacts, wherein said controllers and switches are selected from a group consisting of: rheostats, thermostats, and transformers, wherein said controllers and switches are selectively manipulated to operate and control said selected partial access devices within a specified range wherein said selected partial access devices are local or said selected partial access devices are remote or said selected partial access devices are both local and remote.

21. The one or more access devices and user devices of claim 1, wherein simultaneously said partial access devices send one or more messages in the form of a group consisting of: an oral message, a verbal message, a text message, and data message, wherein said messages are displayed and are associated with an encryption match.

* * * * *